US011889338B2

(12) United States Patent
Marinier et al.

(10) Patent No.: US 11,889,338 B2
(45) Date of Patent: *Jan. 30, 2024

(54) METHODS, SYSTEMS AND APPARATUSES FOR NETWORK ASSISTED INTERFERENCE CANCELLATION AND/OR SUPPRESSION (NAICS) IN LONG-TERM EVOLUTION (LTE) SYSTEMS

(71) Applicant: InterDigital Patent Holdings, Inc., Wilmington, DE (US)

(72) Inventors: Paul Marinier, Montreal (CA); Moon-il Lee, Melville, NY (US); J Patrick Tooher, Montreal (CA); Marian Rudolf, Montreal (CA); Shahrokh Nayeb Nazar, San Diego, CA (US); Janet A Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/078,398

(22) Filed: Dec. 9, 2022

(65) Prior Publication Data

US 2023/0104701 A1    Apr. 6, 2023

Related U.S. Application Data

(63) Continuation of application No. 16/405,669, filed on May 7, 2019, now Pat. No. 11,540,156, which is a (Continued)

(51) Int. Cl.
H04W 24/10    (2009.01)
H04L 5/00     (2006.01)
(Continued)

(52) U.S. Cl.
CPC .......... *H04W 24/10* (2013.01); *H04J 11/005* (2013.01); *H04L 5/0053* (2013.01);
(Continued)

(58) Field of Classification Search
CPC ... H04W 24/10; H04W 72/541; H04J 11/005; H04L 5/0007; H04L 5/0053; H04L 5/0092

See application file for complete search history.

(56) References Cited

U.S. PATENT DOCUMENTS 8,478,190 B2    7/2013   Sayana et al.
8,599,711 B2    12/2013  Hugl et al.
(Continued)

FOREIGN PATENT DOCUMENTS

CN    101808409 A    8/2010
CN    101841828 A    9/2010
(Continued)

OTHER PUBLICATIONS

Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012), 125 pages.
(Continued)

*Primary Examiner* — Basil Ma
(74) *Attorney, Agent, or Firm* — Majid Albassam

(57) ABSTRACT

A method implemented by a Wireless Transmit/Receive Unit (WTRU) includes receiving a DeModulation Interference Measurement (DM-IM) resource, determining an interference measurement based on the DM-IM resource, and demodulating a received signal based on the interference measurement. An interference is suppressed based on the interference measurement. At least one DM-IM resource is located in a Physical Resource Block (PRB). The DM-IM
(Continued)

resource is located in a PRB allocated for the WTRU. The DM-IM resource is a plurality of DM-IM resources which form a DM-IM pattern, and the DM-IM pattern is located on a Physical Downlink Shared Channel (PDSCH) and/or an enhanced Physical Downlink Shared Channel (E-PDSCH) of at least one Long Term Evolution (LTE) subframe. The DM-IM resources are different for different Physical Resource Blocks (PRB) in the LTE subframe. The DM-IM is located in a Long Term Evolution (LTE) Resource Block (RB), and the DM-IM pattern is adjusted.

18 Claims, 13 Drawing Sheets

Related U.S. Application Data continuation of application No. 14/888,027, filed as application No. PCT/US2014/036424 on May 1, 2014, now abandoned.

(60) Provisional application No. 61/820,977, filed on May 8, 2013.

(51) Int. Cl.
  *H04J 11/00* (2006.01)
  *H04W 72/541* (2023.01)

(52) U.S. Cl.
  CPC ......... *H04L 5/0092* (2013.01); *H04W 72/541* (2023.01); *H04L 5/0007* (2013.01)

(56) References Cited

U.S. PATENT DOCUMENTS

| | | | |
|---|---|---|---|
| 8,619,693 | B2 | 12/2013 | Noh et al. |
| 8,660,084 | B2 | 2/2014 | Noh et al. |
| 8,693,463 | B2 | 4/2014 | Kazmi et al. |
| 8,798,188 | B2 | 8/2014 | Kwon et al. |
| 8,824,384 | B2 | 9/2014 | Nam et al. |
| 8,831,119 | B2 | 9/2014 | Kang et al. |
| 8,838,159 | B2 | 9/2014 | Kang et al. |
| 8,923,233 | B2 | 12/2014 | Ko et al. |
| 8,976,751 | B2 | 3/2015 | Yang et al. |
| 8,989,114 | B2 | 3/2015 | Kim et al. |
| 9,008,585 | B2 | 4/2015 | Xiao et al. |
| 9,451,589 | B2 | 9/2016 | Nishio et al. |
| 9,456,372 | B2 | 9/2016 | Lee et al. |
| 9,532,362 | B2 | 12/2016 | Marinier et al. |
| 9,787,383 | B2 | 10/2017 | Seo et al. |
| 10,135,514 | B2 | 11/2018 | Kim et al. |
| 10,419,096 | B2 | 9/2019 | Han et al. |
| 10,720,972 | B2 | 7/2020 | Park et al. |
| 2010/0035555 | A1 | 2/2010 | Bala et al. |
| 2010/0323693 | A1 | 12/2010 | Krishnamurthy et al. |
| 2011/0019776 | A1 | 1/2011 | Zhang et al. |
| 2011/0038302 | A1 | 2/2011 | Papasakellariou et al. |
| 2011/0044187 | A1 | 2/2011 | Moulsley et al. |
| 2011/0017734 | A1 | 6/2011 | Eggenreich et al. |
| 2011/0141987 | A1 | 6/2011 | Nam et al. |
| 2011/0171771 | A1 | 7/2011 | Einsla et al. |
| 2011/0176514 | A1 | 7/2011 | Yoon et al. |
| 2011/0176634 | A1 | 7/2011 | Yoon et al. |
| 2011/0177834 | A1 | 7/2011 | Shin et al. |
| 2011/0235743 | A1 | 9/2011 | Lee et al. |
| 2011/0237267 | A1 | 9/2011 | Chen et al. |
| 2011/0237282 | A1 | 9/2011 | Geirhofer et al. |
| 2011/0300890 | A1 | 12/2011 | Hoshino et al. |
| 2011/0312316 | A1 | 12/2011 | Baldemair et al. |
| 2011/0319109 | A1 | 12/2011 | Kang et al. |
| 2012/0020421 | A1 | 1/2012 | Larsson et al. |
| 2012/0051257 | A1 | 3/2012 | Kim et al. |
| 2012/0051319 | A1 | 3/2012 | Kwon et al. |
| 2012/0076028 | A1 | 3/2012 | Ko et al. |
| 2012/0088458 | A1 | 4/2012 | Nogami et al. |
| 2012/0108254 | A1 | 5/2012 | Kwon et al. |
| 2012/0120817 | A1 | 5/2012 | Khoshnevis et al. |
| 2012/0120903 | A1 | 5/2012 | Kim et al. |
| 2012/0122502 | A1 | 5/2012 | Shin et al. |
| 2012/0127869 | A1 | 5/2012 | Yin et al. |
| 2012/0140708 | A1 | 6/2012 | Choudhury et al. |
| 2012/0176939 | A1 | 7/2012 | Qu et al. |
| 2012/0176996 | A1 | 7/2012 | Kim et al. |
| 2012/0188976 | A1 | 7/2012 | Kim et al. |
| 2012/0201154 | A1 | 8/2012 | Chandrasekhar et al. |
| 2012/0201163 | A1 | 8/2012 | Joengren et al. |
| 2012/0207043 | A1 | 8/2012 | Geirhofer et al. |
| 2012/0207047 | A1 | 8/2012 | Liao et al. |
| 2012/0208547 | A1 | 8/2012 | Geirhofer et al. |
| 2012/0213261 | A1 | 8/2012 | Sayana et al. |
| 2012/0218968 | A1 | 8/2012 | Kim et al. |
| 2012/0220286 | A1 | 8/2012 | Chen et al. |
| 2012/0257515 | A1 | 10/2012 | Hugl et al. |
| 2012/0257553 | A1 | 10/2012 | Noh et al. |
| 2012/0281567 | A1 | 11/2012 | Gao et al. |
| 2012/0287799 | A1 | 11/2012 | Chen et al. |
| 2012/0287875 | A1 | 11/2012 | Kim et al. |
| 2013/0003788 | A1 | 1/2013 | Marinier et al. |
| 2013/0021925 | A1 | 1/2013 | Yin et al. |
| 2013/0028109 | A1 | 1/2013 | Joengren et al. |
| 2013/0028138 | A1 | 1/2013 | Hao et al. |
| 2013/0028225 | A1 | 1/2013 | Ko et al. |
| 2013/0034178 | A1 | 2/2013 | Hu et al. |
| 2013/0044664 | A1 | 2/2013 | Nory et al. |
| 2013/0058307 | A1 | 3/2013 | Kim et al. |
| 2013/0070634 | A1 | 3/2013 | Gao et al. |
| 2013/0077513 | A1 | 3/2013 | Ng et al. |
| 2013/0077521 | A1 | 3/2013 | Feng et al. |
| 2013/0077707 | A1 | 3/2013 | Koivisto et al. |
| 2013/0083681 | A1 | 4/2013 | Ebrahimi et al. |
| 2013/0083682 | A1 | 4/2013 | Ng et al. |
| 2013/0089159 | A1 | 4/2013 | Liu |
| 2013/0094384 | A1 | 4/2013 | Park et al. |
| 2013/0094464 | A1 | 4/2013 | Li et al. |
| 2013/0114430 | A1 | 5/2013 | Koivisto et al. |
| 2013/0114554 | A1 | 5/2013 | Yang et al. |
| 2013/0148515 | A1 | 6/2013 | Ribeiro et al. |
| 2013/0208604 | A1 | 8/2013 | Lee et al. |
| 2013/0223332 | A1 | 8/2013 | Wu et al. |
| 2013/0242902 | A1 | 9/2013 | Liu et al. |
| 2013/0250788 | A1 | 9/2013 | Kim et al. |
| 2013/0273931 | A1 | 10/2013 | Lunttila et al. |
| 2013/0286997 | A1 | 10/2013 | Davydov et al. |
| 2013/0301467 | A1 | 11/2013 | Kang et al. |
| 2013/0315197 | A1 | 11/2013 | Park et al. |
| 2013/0336214 | A1 | 12/2013 | Sayana et al. |
| 2013/0343301 | A1 | 12/2013 | Geirhofer et al. |
| 2014/0016497 | A1 | 1/2014 | Seo et al. |
| 2014/0044061 | A1 | 2/2014 | Yue et al. |
| 2014/0066116 | A1 | 3/2014 | Gao et al. |
| 2014/0086082 | A1 | 3/2014 | Kim et al. |
| 2014/0086155 | A1 | 3/2014 | Chen |
| 2014/0112177 | A1 | 4/2014 | Park et al. |
| 2014/0133336 | A1 | 5/2014 | Park et al. |
| 2014/0161066 | A1 | 6/2014 | Chmiel et al. |
| 2014/0211723 | A1 | 7/2014 | Xia et al. |
| 2014/0241199 | A1 | 8/2014 | Chun et al. |
| 2014/0286189 | A1 | 9/2014 | Kang et al. |
| 2015/0003425 | A1 | 1/2015 | Kim et al. |
| 2015/0078272 | A1 | 3/2015 | Kim et al. |
| 2015/0124717 | A1 | 5/2015 | Li et al. |
| 2015/0249517 | A1 | 9/2015 | Seo et al. |
| 2015/0358093 | A1 | 12/2015 | Seo et al. |
| 2015/0381254 | A1 | 12/2015 | Liang et al. |
| 2016/0014757 | A1 | 1/2016 | Lee et al. |
| 2016/0065290 | A1 | 3/2016 | Zhu et al. |
| 2016/0080094 | A1 | 3/2016 | Kim et al. |
| 2016/0154589 | A1 | 6/2016 | Takeda et al. |
| 2017/0006592 | A1 | 1/2017 | Hoshino et al. |
| 2017/0250787 | A1 | 8/2017 | Geirhofer et al. |
| 2018/0234136 | A1 | 8/2018 | Marinier et al. |

(56) References Cited

U.S. PATENT DOCUMENTS

| | | | |
|---|---|---|---|
| 2021/0321412 A1* | 10/2021 | Sakhnini | ............... H04L 5/0094 |
| 2022/0231743 A1 | 7/2022 | Lee et al. | |

FOREIGN PATENT DOCUMENTS

| | | |
|---|---|---|
| CN | 101877608 A | 11/2010 |
| CN | 101924610 A | 12/2010 |
| CN | 102149124 A | 8/2011 |
| CN | 102158302 A | 8/2011 |
| CN | 102291224 A | 12/2011 |
| CN | 102356577 A | 2/2012 |
| CN | 102469466 A | 5/2012 |
| CN | 102577196 A | 7/2012 |
| CN | 103069875 A | 4/2013 |
| EP | 2448139 A2 | 5/2012 |
| EP | 2624473 A2 | 8/2013 |
| EP | 2627141 A2 | 8/2013 |
| EP | 2673929 A2 | 12/2013 |
| EP | 2824849 A1 | 1/2015 |
| JP | 2011004212 | 1/2011 |
| JP | 2011004212 A | 1/2011 |
| JP | 2011171710 A | 9/2011 |
| JP | 2012105323 A | 5/2012 |
| JP | 2012510772 A | 5/2012 |
| JP | 2013507075 A | 2/2013 |
| KR | 20100121445 A | 11/2010 |
| KR | 20120011794 A | 2/2012 |
| KR | 20120033282 A | 4/2012 |
| KR | 20130050273 A | 5/2013 |
| WO | WO 2009019079 A1 | 2/2009 |
| WO | WO 2010064842 A2 | 6/2010 |
| WO | WO 2010106725 A1 | 9/2010 |
| WO | WO 2010151050 A2 | 12/2010 |
| WO | WO 2011038410 A1 | 3/2011 |
| WO | WO 2011041544 A2 | 4/2011 |
| WO | WO 2011041623 A1 | 4/2011 |
| WO | WO 2011041759 A1 | 4/2011 |
| WO | WO 2011054003 A1 | 5/2011 |
| WO | WO 2011074807 A2 | 6/2011 |
| WO | WO 2011085195 A1 | 7/2011 |
| WO | WO 2011085230 A2 | 9/2011 |
| WO | WO 2011115421 A1 | 9/2011 |
| WO | WO 2011160926 A1 | 12/2011 |
| WO | WO 2012008815 A2 | 1/2012 |
| WO | WO 2012094608 A2 | 7/2012 |
| WO | WO 2012109037 A2 | 11/2012 |
| WO | WO 2012155520 A1 | 11/2012 |
| WO | WO 2013021531 A1 | 2/2013 |
| WO | WO 2013025558 A1 | 2/2013 |
| WO | WO 2013081368 A1 | 6/2013 |
| WO | WO 2013112024 A1 | 8/2013 |
| WO | WO 2013133653 A1 | 9/2013 |
| WO | WO 2013170114 A1 | 11/2013 |
| WO | WO 2013184613 A3 | 3/2014 |

OTHER PUBLICATIONS

3GPP TS 38.331 V15.13.0, "Technical Specification Group Radio Access Network; NR; Radio Resource Control (RRC) protocol specification (Release 15)", 3rd Generation Partnership Project; (Mar. 2021), 540 pages.

Third Generation Partnership Project, "Technical Specification Group Radio Access Network; NR; Physical channels and modulation (Release 15)," 3GPP TS 38.211 V15.8.0 (Dec. 2019), 97 pages.

3GPP TS 38.214 V15.12.0, "Technical Specification Group Radio Access Network; NR; Physical layer procedures for data (Release 15)", 3rd Generation Partnership Project; (Mar. 2021), 106 pages.

LTE; Evolved Universal Terrestrial Radio Access (E-UTRA); Physical layer procedures (3GPP TS 36.213 version 10.1.0 Release 10), ETSI TS 136 213 V10.1.0, Apr. 2011, 117 pages.

Samsung, "Multi-Cell Periodic CSI Reporting for DL CA", 3GPP Tdoc R1-113076; 3GPP TSG RAN WG1 Meeting #66bis; Zhuhai, China, Oct. 10-14, 2011, 4 pages.

Huawei et al.,"Way Forward on CSI-RS signalling For FDD and TDD", 3GPP Tdoc R1-105795, 3GPP TSG RAN WG1 Meeting #62bis, Xi'an, China, Oct. 11-15, 2010, 5 pages.

3rd Generation Partnership Project; Technical Specification Group Radio Access Network; Evolved Universal Terrestrial Radio Access (E-UTRA); Radio Resource Control (RRC); Protocol specification (Release 10), 3GPP TS 36.331 V10.5.0, May 2012, 302 pages.

Samsung, "Inter-cell CSI RS design in heterogeneous network", 3GPP Tdoc R1-101157, 3GPP TSG RAN WG1 Meeting #60, San Francisco, USA, Feb. 22-26, 2010, 2 pages.

3rd Generation Partnership Project (3GPP), TS 36.331 V0.3.0, "Technical Specification Group Radio Access Network Evolved Universal Terrestrial Radio Access (E-UTRA) Radio Resource Control (RRC), Protocol Specification (Release 8)", Sep. 2007, pp. 1-31.

3rd Generation Partnership Project; Technical Specification Group RadioAccess Network;Further Advancements for E-UTRAPhysical Layer Aspects(Release 9),3GPP Draft; TR 36.814 130, 3rd Generation Partnership Project (3GPP), Mobile Competence Centre ; 650, Route Des Lucioles ; F-06921 Sophia-Antipolis Cedex ; France, no. Shenzhen, China; Aug. 24, 2009, I Jun. 2009 (Jun. 1, 2009), XP050388254, 46 pages.

3rd Generation Partnership Project; Technical Specification Group Radio Access Network; Evolved Universal Terrestrial Radio Access (E-UTRA); Physical channels and modulation (Release 10), 3GPP TS 36.211 V10.0.0, Dec. 2010, 103 pages.

Ericsson et al: "Control Signaling in Support of CoMP", 3GPP Draft; R1-122843, 3rd Generation Partnership Project (3GPP), Mobile Competence Centre ; 650, Route Des Lucioles ; F-06921 Sophiaantipolis Cedex ; France, vol. RAN WGI , no. Prague, Czech Republic; May 21, 2012-May 30, 2012, May 12, 2012(May 12, 2012), XP050601017.

R1-121946, CSI feedback modes for CoMP, Huawei et al., 3GPP TSG RAN WG1 Meeting #69.

Fujitsu, "Email discussion [69-11]: FFS aspects of aperiodic CSI feedback for CoMP," 3GPP Tdoc R1-122931, 3GPP TSG RAN WG1 Meeting #69, May 21-25, 2012, 22 pages.

Ericsson et al., Network Assistance for Interference Cancellation in Cell Range Expansion for Heterogeneous Networks, 3GPP Tdoc R1-131547; 3GPP TSG RAN WG1 Meeting #72bis, Chicago, USA, Apr. 15-19, 2013, 8 pages.

Media Tek et al.,Study on Network-Assisted Interference Cancellation and Suppression for LTE, 3GPP Tdoc RP-130404; 3GPP TSG RAN Meeting #59, Vienna, Austria, Feb. 26-Mar. 1, 2013, 7 pages.

ZTE,Consideration for network assisted receiver enhancement, 3GPP Tdoc R1-131061, 3GPP TSG-RAN1 #72bis, Chicago, USA, Apr. 15-19, 2013, 7 pages.

NTT Docomo,DL RS RAN1 Chairmanâ€™s Notes, 3GPP Tdoc R1-105803; 3GPP TSG RAN WG1 Meeting #62bis; Xi'an, China, Oct. 11-15, 2010, 4 pages.

Ericsson et al., Control Signaling in Support of CoMP, 3GPP Tdoc R1-122843; 3GPP TSG-RAN WG1 Meeting #69; Prague, Czech Republic, May 21-30, 2012, 3 pages.

New Postcom, Downlink CSI-RS signaling design for LTE-Advanced, 3GPP Tdoc R1-105035; 3GPP TSG RAN WG1 Meeting #62; Madrid, Spain, Aug. 23-27, 2010, 5 pages.

ZTE, Interference coordination for control channels under non-CA based heterogeneous deployments, 3GPP Tdoc R1-104566; 3GPP TSG RAN WG1 Meeting #62; Madrid, Spain, Aug. 23-27, 2010, 10 pages.

3rd Generation Partnership Project; Technical Specification Group Radio Access Network; Evolved Universal Terrestrial Radio Access (E-UTRA); Physical Channels and Modulation (Release 10), 3GPP TS 36.211 V10.4.0, Dec. 2011, 101 pages.

Ericsson et al.,RI and PMI sharing between multiple CSI processes, 3GPP Tdoc R1-122836, May 21-30, 2012, 6 pages.

3rd Generation Partnership Project; Technical Specification Group Radio Access Network; Radio Resource Control (RRC); Protocol specification (Release 10), 3GPP TS 25.331 V10.2.0, Dec. 2010, 1834 pages.

"3rd Generation Partnership Project; Technical Specification Group RadioAccess Network; Evolved Universal Terrestrial Radio Access (E-UTRA)Radio Resource Control (RRC);Protocol

(56) References Cited

OTHER PUBLICATIONS

Specification(Release 8)", F-069213GPP Draft; R2-074005 E-UTRA RRC Specification-V030-CLEAN,3GPP TS 36.331 v.0.3.0, Sep. 2007, 31 pages.
3rd Generation Partnership Project (3GPP), TS 36.214 V10.1.0, "Technical Specification Group Radio Access Network, Evolved Universal Terrestrial Radio Access (E-UTRA), Physical Layer, Measurements (Release 10)", Mar. 2011, pp. 1-13.
Zte, "Remaining issues of Rel-10 eICIC", 3GPP Tdoc R1-110175, 3GPP TSG RAN WG1 Meeting #63bis, Dublin, Ireland, Jan. 17-21, 2011, 3 pages.
R1-122953, Interference Measurement Mechanism for Rel-11, NTT DOCOMO, 3GPP TSG RAN WG1 Meeting #69.
Zte, "Downlink control signaling for CoMP", 3GPP Tdoc R1-122143, 3GPP TSG RAN WG1 Meeting #69, Prague, Czech Republic, May 21-25, 2012, 5 pages.
Interdigital Communications et al: "Configurability of Pc", 3GPP Draft; R1-124262, 3rd Generation Partnership Project (3GPP), Mobile Competence Centre ; 650, Route Des Lucioles ; F-06921 Sophiaantipolis Cedex ; Francevol. RAN WGl , no. San Diego, USA; Oct. 8, 2012-Oct. 12, 2012 Sep. 29, 2012(Sep. 29, 2012),XP050662168Retrieved from the Internet:URL:http://www.3gpp.org/ftp/tsg_ran/WG1 RLI/TSGRI70b/Docs/[retrieved on Sep. 29, 2012], 2 pages.
Samsung,Discussion on NAICS Evaluation Assumptions, 3GPP Tdoc R1-131040, 3GPP TSG RAN WG1 #72bis, Chicago, USA, Apr. 15-19, 2013, 9 pages.
Nokia,Achievable CQI measurement accuracy over CSI-RS, 3GPP Tdoc R1-101900; 3GPP TSG-RAN WG1 Meeting #60bis; Beijing, China, Apr. 12-16, 2010, 3 pages.
3rd Generation Partnership Project; Technical Specification Group Radio Access Network; Evolved Universal Terrestrial Radio Access (E-UTRA); Physical Channels and Modulation (Release 10), 3GPP TS 36.211 V10.1.0, Mar. 2011, 103 pages.
Samsung, Support for Increased CSI Feedback Payloads in PUCCH, 3GPP Tdoc R1-103642; 3GPP TSG RAN WG1 Meeting #61bis; Dresden, Germany, Jun. 28-Jul. 2, 2010, 3 pages.
United States Publication No. 2013/0208604, published Aug. 15, 2013, 1 page.
Catt, "Flexible configuration of PDSCH muting", 3GPP Tdoc R1-105920, 3GPP TSG RAN WG1 meeting #63, Jacksonville, USA, Nov. 15-19, 2010, 3 pages.
Huawei, 3GPP Tdoc R1-092364; "Consideration on CSI-RS design for CoMP and text proposal to 36.814", 3GPP TSG RAN WG1 Meeting #57bis, Jun. 29-Jul. 3, 2009, Los Angeles, USA, 9 pages.
International Search Report and Written Opinion, PCT Application No. PCT/US14/36424, dated Mar. 17, 2015, 16 pages.
Zte, "CSI Feedback Modes for CoMP", 3GPP Tdoc R1-122135, 3GPP TSG RAN WG1 Meeting #69, Prague, Czech Republic, May 21-25, 2012, 5 pages.
Huawei et al., "Aperiodic CSI feedback triggering for CoMP", 3GPP Tdoc R1-123105, 3GPP TSG RAN WG1 Meeting #70, Qingdao, China, Aug. 13-17, 2012, 3 pages.
3rd Generation Partnership Project; Technical Specification Group Radio AccessNetwork; Evolved Universal Terrestrial Radio Access (E-UTRA); Physical layer procedures (Release 1 3GPP Standard; 3GPP-rs 36.213, 3rd Generation Partnership Project (3GPP), Mobile Competence Centre ; 650, Route Des Lucioles ; F-06921Sophia-Antipolis Cedex ; France, vol. RAN WGI , No. VI 0.5.O, Mar. 7, 2012 (Mar. 7, 2012), pp. 1-125, XP050579996.
3rd Generation Partnership Project; Technical Specification Group Radio Access Network; Evolved Universal Terrestrial Radio Access (E-UTRA); Multiplexing and channel coding (Release 11), 3GPP TS 36.212 V11.2.0, Feb. 2013, 82 pages.
3rd Generation Partnership Project; Technical Specification Group Radio Access Network; Evolved Universal Terrestrial Radio Access (E-UTRA); Physical Channels and Modulation (Release 11), 3GPP TS 36.211 V11.2.0, Feb. 2013, 109 pages.
3rd Generation Partnership Project; Technical Specification Group Radio Access Network; Evolved Universal Terrestrial Radio Access (E-UTRA); Physical layer procedures (Release 11), 3GPP TS 36.213 V11.2.0, Feb. 2013, 173 pages.
3rd Generation Partnership Project; Technical Specification Group Radio Access Network; Evolved Universal Terrestrial Radio Access (E-UTRA); Requirements for support of radio resource management (Release 10), 3GPP TS 36.133 V10.10.0, Mar. 2013, 681 pages.
Huawei et al.,"CSI feedback modes for CoMP", 3GPP Tdoc R1-121946; 3GPP TSG RAN WG1 Meeting #69; Prague, Czech Republic, May 21-25, 2012, 3 pages.
New Postcom, "Considerations on interference measurement resource for CoMP", 3GPP Tdoc R1-122367; 3GPP TSG RAN WG2 Meeting #69; Prague, Czech Republic, May 21-25, 2012, 5 pages.
3rd Generation Partnership Project; Technical Specification Group Radio Access Network; Evolved Universal Terrestrial Radio Access (E-UTRA); Multiplexing and channel coding (Release 10), 3GPP TS 36.212 V10.1.0, Mar. 2011, 76 pages.
Ericsson, et al., "On CSI RS Design", 3GPP Tdoc R1-100048, 3GPP TSG-RAN WG1 Meeting #59bis, Valencia, Spain, Jan. 18-22, 2010, 2 pages.
3rd Generation Partnership Project; Technical Specification Group Radio Access Network; Evolved Universal Terrestrial Radio Access (E-UTRA); Requirements for support of radio resource management (Release 10), 3GPP TS 36.133 V10.14.0, Mar. 2014, 716 pages.
NTT Docomo et al., "CSI RS Configuration to Support 4 Tx MIMO UE in 8 Tx Networks", 3GPP Tdoc R1-110861, 3GPP TSG RAN WG1 Meeting #64; Taipei, Taiwan., Feb. 21-25, 2011, 5 pages.
Interdigital Communications, LLC, "Interference Measurements for CoMP", 3GPP Tdoc R1-122549; 3GPP TSG-RAN WG1 Meeting #69; Prague, Czech Republic, May 21-25, 2012, 6 pages.
NTT Docomo et al., "Higher layer signaling of CSI-RS and muting configurations", 3GPP Tdoc R2-110607; 3GPP TSG-RAN WG2 Meeting #72bis; Dublin, Ireland, Jan. 17-21, 2011, 3 pages.
3rd Generation Partnership Project; Technical Specification Group Radio Access Network; Evolved Universal Terrestrial Radio Access (E-UTRA); Physical layer procedures (Release 10), 3GPP TS 36.213 V10.3.0, Sep. 2011, 122 pages.
Panasonic, "PDSCH muting discussion for specification impacts", 3GPP Tdoc R1-104899; 3GPP TSG RAN WG1 Meeting #62; Madrid, Spain, Aug. 23-27, 2010, 3 pages.
Interdigital Communications, LLC, "Remaining Issues with Periodic Feedback for CoMP", 3GPP Tdoc R1-123402; 3GPP TSG-RAN WG1 Meeting #70; Qingdao, China, Aug. 13-17, 2012, 2 Pages.
United States Office Action, U.S. Appl. No. 14/888,027, filed May 5, 2017, 21 pages.
3rd Generation Partnership Project; Technical Specification Group Radio Access Network; Further Advancements for E-UTRA Physical Layer Aspects (Release 9), 3GPP TR 36.814 V1.3.0, Jun. 2009, 47 pages.
3rd Generation Partnership Project; Technical Specification Group Radio Access Network; Evolved Universal Terrestrial Radio Access (E-UTRA);Physical layer procedures (Release 9), 3GPP TS 36.213 V9.0.1, Dec. 2009, 79 pages.
Huawei: "The Standardization Impacts of Downlink CoMP", 3GPP Draft; RI-100258 the Standardization Impacts of Downlink Comp V3, 3rd Generation Partnership Project(3GPP), Mobile Competence Centre ; 650, Route Des Lucioles ; F-06921 Sophia-Antipolis Cedex ; France, vol. RAN WGI, no. Valencia, Spain; Jan. 18, 2001, Jan. 12, 2010 (Jan. 12, 2010), XP050417940, 3 pages.
Catt, "On CSI feedback modes for CoMP", 3GPP Tdoc R1-122039, 3GPP TSG RAN WG1 Meeting #69, Prague, Czech Republic, May 21-25, 2012, 6 pages.
New Postcom: "Discussion on Pc configuration for CoMP", 3GPP Draft; R1-124229 Discussion on PC Configuration for Comp, 3rd Generation Partnership Project (3GPP), Mobile Competence Centre ; 650, Route Des Lucioles ; F-06921 Sophia-Antipolis Cedex ; France vol. RAN WGI , no. San Diego, USA; Oct. 8, 2012-Oct. 12, 2012 Sep. 29, 2012(Sep. 29, 2012), XP050662136, Retrieved from the Internet:URL: http://www.3gpp.org/ftp/tsg_ran/WG1_RLI/TSGRI_70b/Docs/[retrieved on Sep. 29, 2012], 3 pages.

(56) References Cited

OTHER PUBLICATIONS

Fujitsu, "Comp Cell Set Configuration", 3GPP Tdoc R2-093075; 3GPP TSG-RAN WG2 Meeting #66; San Francisco, USA, May 4-8, 2009, 5 pages.
Fujitsu, "Email discussion [69-10]: Details of collision handling and compression/multiplexing in case of 2 or more CSIs being configured in the same reporting instance for CoMP CSI feedback", 3GPP Tdoc R1-122930; 3GPP TSG RAN WG1 Meeting #69; Prague, Czech Republic, May 21-25, 2012, 30 pages.
NTT Docomo, "Interference Measurement Mechanism for Rel-11", 3GPP Tdoc R1-122953; 3GPP TSG RAN WG1 Meeting #69; Prague, Czech Republic, May 21-25, 2012, 10 pages.
Huawei et al., "Interference measurement resource configuration and CQI calculation", 3GPP Tdoc R1-121947; 3GPP TSG RAN WG1 Meeting #69; Prague, Czech Republic, May 21-25, 2012, 7 pages.
3rd Generation Partnership Project; Technical Specification Group Radio Access Network; Evolved Universal Terrestrial Radio Access (E-UTRA); Physical layer procedures (Release 10), 3GPP TS 36.213 V10.1.0, Mar. 2011, 115 pages.
Zte, "Investigation on CSI-RS Muting", 3GPP TDoc R1-103587; 3GPP TSG RAN WG1 Meeting #61bis; Dresden, Germany, Jun. 28-Jul. 2, 2010, 8 pages.
Nokia et al., "Multi-cell CSI-RS design aspects", 3GPP Tdoc R1-093909; 3GP TSG-RAn WG1 Meeting #58bis, Miyazaki, Oct. 12-16, 2009, 11 pages.
Huawei et al., "Proposal for specification of PDSCH Muting", 3GPP Tdoc R1-105132, 3GPP TSG RAN WG1 meeting #62bis, Xi'an, China, Oct. 11-15, 2010, 6 pages.
Texas Instruments, "Periodic CSI reporting for Carrier Aggregation", 3GPP Tdoc R1-105888; PP TSG RAN WG1 Meeting #63; Jacksonville, USA, Nov. 15-19, 2010, 4 pages.
Interdigital, "Analysis of Feedback Mechanisms for CoMP", 3GPP Tdoc R1-092585; 3GPP TSG RAN WG1f-06921 Meeting #57bis, Los Angeles, CA, Jun. 29-Jul. 3, 2009, 10 pages.
U.S. Appl. No. 61/761,672, filed Feb. 6, 2013, 33 pages.
Catt, "Consideration on interference measurement", 3GPP Tdoc R1-105921, 3GPP TSG RAN WG1 Meeting #63, Jacksonville, USA, Nov. 15-19, 2010, 4 pages.
Texas Instruments, "Other configuration aspects for CoMP", 3GPP Tdoc R1-124137, 3GPP TSG RAN WG1 Meeting #70bis, San Diego, CA, USA, Oct. 8-12, 2012, 3 pages.
Zte, "Discussion and Evaluation on interference measurement", 3GPP Tdoc R1-113773; 3GPP TSG-RAN WG1 Meeting #67; San Francisco, USA, Nov. 14-18, 2011, 8 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300 V11.1.0, Mar. 2012, 194 pages.
3rd Generation Partnership Project; Technical Specification Group Radio Access Network; Evolved Universal Terrestrial Radio Access (E-UTRA); Physical layer procedures (Release 10), DRAFT3GPP TS 36.213 Va.0.0, Dec. 2010, 98 pages.
Renesas Mobile Europe Ltd., "On periodic feedback", 3GPP Tdoc R1-123581; 3GPP TSG-RAN WG1 Meeting #70, Qingdao, China, Aug. 13-17, 2012, 5 pages.
Nokia Siemens Network, "PDSCH RE muting for CSI-RS", 3GPP Tdoc R1-105529; 3GPP TSG-RAN WG1 Meeting #62bis; Xi'an, China, Oct. 11-15, 2010, 6 pages.
Panasonic, "Required Information at the UE in Comp", 3GPP Tdoc R1-092530; 3GPP TSG RAN WG1 Meeting #57bis; Los Angeles, USA, Jun. 29-Jul. 2, 2009, 2 pages.
Tri, "Periodic Feedback for CoMP with RI-Reference-Process", 3GPP Tdoc R1-125022; 3GPP TSG-RAN WG1 Meeting #71, New Orleans, USA, Nov. 12-16, 2012, 2 pages.
3rd Generation Partnership Project (3GPP), TS 36.213 V11.4.0, "Technical Specification Group Radio Access Network, Evolved Universal Terrestrial Radio Access (E-UTRA), Physical Layer Procedures (Release 11)", Sep. 2013, pp. 1-182.
3rd Generation Partnership Project; Technical Specification Group Radio Access Network; Evolved Universal Terrestrial Radio Access (E-UTRA); Physical layer procedures (Release 10), 3GPP TS 36.213 v10.5.0, Mar. 2012, 125 pages.
3rd Generation Partnership Project; Technical Specification Group Radio Access Network; Evolved Universal Terrestrial Radio Access (E-UTRA); Physical layer; Measurements (Release 10), 3GPP TS 36.214 10.1.0, Mar. 2011, 13 pages.
Texas Instruments, "Advanced DL Comp Schemes and Related Feedback Support", 3GPP Tdoc R1-093998; 3GPP TSG RAN WG1 Meeting #58 bis; Miyazaki, Japan, Oct. 12-16, 2009, 2 pages.
LG Electronics: "Discussions on DL Control Signaling Enhancement", 3GPP Draft; R1-111789_LG_REL 11_CTRL_ENHANCE, 3rd Generation Partnership Project (3GPP), May 5, 2011 (May 5, 2011)see section 2.A, 3 pages.
3GPP Draft; R1-103843 "Views on CSI RS Muting", 3rd Generation Partnership Project (3GPP), Mobilecompetence Centre ; 650, Route Des Lucioles ; F-06921 Sophia-Antipolis Cedex ; France, vol. RAN WG1, no. Dresden, Germany; Jun. 28, 2010-Jul. 2, 2010, Jun. 22, 2010 (Jun. 22, 2010), XP050598483,[retrieved on Jun. 22, 2010], 3 pages.
European Telecommunications Standards Institute (ETSI), TS 136 213 V9.0.1, "Evolved Universal Terrestrial Radio Access (E-UTRA), Physical Layer Procedures (3GPP TS 36.213 Version 9.0.1 Release 9)", Jan. 2010, 81 pages.
3rd Generation Partnership Project; Technical Specification Group Access Network; Evolved Universal Terrestrial Radio Access (E-UTRA); Requirements for support of radio resource management (Release 9), 3GPP TS 36.133 V9.15.0, Mar. 2013, 522 pages.
3rd Generation Partnership Project; Technical Specification Group Access Network; Evolved Universal Terrestrial Radio Access (E-UTRA); Requirements for support of radio resource management (Release 9), 3GPP TS 36.133 V9.19.0, Mar. 2014, 528 pages.
Invitation to Pay Additional Fees; Partial Search Report, International Application No. PCT/US2014/036424, dated Jul. 31, 2014, 5 pages.
LTE; Evolved Universal Terrestrial Radio Access (E-UTRA); Physical layer; Measurements (3GPP TS 36.214 version 10.1.0 Release 10), ETSI TS 136 214 v10.1.0, Apr. 2011, 15 pages.
Samsung, "Necessity of Orthogonal Inter-cell CSI-RS Patterns", 3GPP Tdoc R1-101156; 3GPP TSG RAN WG1 Meeting #60, San Francisco, USA, Feb. 22-26, 2010, 3 pages.
Samsung, "CSI Collision Handling for CoMP", 3GPP Tdoc R1-123468; 3GPP TSG RAN WG1 Meeting #70, Qingdao, China, Aug. 13-17, 2012, 3 pages.
Huawei, et al., R1-101695, "TP for 3GPP TR36.814 on Comp", 3GPP TSG RAN WG1 #60, 3GPP Server Publication Date (Mar. 1, 2010), 6 pages.
Catt, "Interference Measurement over Muted Re", 3GPP Tdoc R1-110049; 3GPP TSG RAN WG1 Meeting #63bis; Dublin, Ireland, Jan. 17-21, 2011, 4 pages.
Ericsson, "Further Details on CSI RS Configuration", 3GPP Tdoc R1-105322; 3GPP TSG-RAN WG1 Meeting #62bis; Xi'an, China, Oct. 11-15, 2010, 4 pages.
R1-122040 , "Discussion on interference measurement mechanisms", 3GPP TSG RAN WG1 Meeting #69 Prague, Czech Republic, May 21-25, 2012, 5 pages.
Rapptuer (Samsung),Introduction of Carrier Aggregation and UL/DL MIMO, 3GPP Tdoc R2-106147, 3GPP TSG-RAN WG2 Meeting #72, Jacksonville, US, Nov. 15-19, 2010, 82 pages.
R1-122840 , "Interference Measurements for CoMP CSI Reporting", 3GPP TSG-RAN WG1 #69 Prague, Czech Republic, May 21-30, 2012, 4 pages.
R1-121953 , "Higher layer signalling requirements for CoMP", 3GPP TSG RAN WG1 Meeting #69 Prague, Czech Republic, May 21-25, 2012, 4 pages.

\* cited by examiner

| Bit width | Complex-valued modulation | Real-valued modulation | Modulation order ($Q_m$) |
|---|---|---|---|
| A single bit [b(i)] | BPSK [2] | M-ary PAM (M=2) | 1 |
| Pairs of bits [b(i), b(i+1)] | QPSK [2] | M-ary PAM (M=4) | 2 |
| Quadruplets of bits [b(i), b(i+1), b(i+2), b(i+3)] | 16QAM [2] | M-ary PAM (M=16) | 4 |
| Hextuplets of bits [b(i), b(i+1), b(i+2), b(i+3), b(i+4), b(i+6)] | 64QAM [2] | M-ary PAM (M=64) | 6 |

FIG. 4

METHODS, SYSTEMS AND APPARATUSES FOR NETWORK ASSISTED INTERFERENCE CANCELLATION AND/OR SUPPRESSION (NAICS) IN LONG-TERM EVOLUTION (LTE) SYSTEMS

CROSS REFERENCE TO RELATED APPLICATIONS

This application is a Continuation of U.S. patent application Ser. No. 16/405,669, filed May 7, 2019, which is a Continuation of U.S. patent application Ser. No. 14/888,027, filed Oct. 29, 2015, now abandoned, which is a National Stage Application filed under 35 U.S.C. 371 of International Patent Application No. PCT/US2014/036424, filed May 1, 2014, and which claims the benefit of U.S. Provisional Application No. 61/820,977, filed May 8, 2013, the contents of each of which is incorporated herein by reference in its entirety.

BACKGROUND

Field

This application is related to wireless communication.

Related Art

Long Term Evolution (LTE)
LTE: Single Carrier
3$^{rd}$ Generation Partnership Project (3GPP) long term evolution (LTE) Release 8 and/or 9 (LTE Rel-8/9) may support up to 100 Mbps in a Downlink (DL), and 50 Mbps in an Uplink (UL) for a 2×2 configuration. The LTE DL transmission scheme is based on an Orthogonal Frequency Division Multiple Access (OFDMA) air interface.

LTE Rel-8/9 and/or release 10 (collectively "LTE Rel-8/9/10") systems support scalable transmission bandwidths (e.g., for purposes of flexible deployment, etc.). Such scalable transmission bandwidths may include, for example, bandwidths of 1.4, 2.5, 5, 10, 15 and 20 megahertz (MHz).

In LTE Rel-8/9 (and as applicable to LTE Rel-10), each radio frame has a duration of 10 milliseconds (ms), and consists of 10 subframe each of which is 1 ms. Each subframe consists of 2 timeslots of 0.5 ms each. There may be either seven (7) or six (6) OFDM symbols per timeslot. The seven (7) symbols per timeslot are used with a normal cyclic prefix length, and the six (6) symbols per timeslot are used with an extended cyclic prefix length. Subcarrier spacing for the LTE Rel-8/9 system is 15 kHz. A reduced subcarrier spacing mode using 7.5 kHz is also possible.

A resource element (RE) corresponds to one (1) subcarrier during one (1) OFDM symbol interval. Twelve (1) consecutive subcarriers during a 0.5 ms timeslot constitute one (1) Resource Block (RB). Therefore, with seven (7) symbols per timeslot, each RB consists of 1*7=84 REs. A DL carrier may range from six (6) RBs up to one-hundred ten (110) RBs corresponding to an overall scalable transmission bandwidth of roughly 1 MHz to 20 MHz. Each transmission bandwidth, e.g., 1.4, 3, 5, 10 or 20 MHz, corresponds to a number of RBs.

A basic time domain unit for dynamic scheduling is one subframe, which consists of two consecutive timeslots. This is sometimes referred to as a resource block pair. Certain subcarriers on some OFDM symbols are allocated to carry pilot signals in the time/frequency grid. A number of subcarriers at edges of the transmission bandwidth are generally not transmitted so as to comply with spectral mask requirements.

In LTE Rel-8/9, and in Rel-10 in single carrier configuration where the network may assign the UE only one pair of UL and DL carriers (FDD) or one carrier time shared for UL and DL (TDD), for any given subframe there may be a single Hybrid Automatic Repeat reQuest (HARQ) process active for the UL and a single HARQ process active in the DL.

LTE: Carrier Aggregation (CA)

LTE Advanced with Carrier Aggregation (LTE CA Rel-10) is an evolution that aims to improve single carrier LTE data rates using, among other examples, bandwidth extensions also referred to as carrier aggregation (CA). With CA, a user equipment (UE) may transmit and receive simultaneously over a Physical Uplink Shared Channel (PUSCH) and a Physical Downlink Shared Channel (PDSCH) (respectively) of multiple serving cells. For example, up to four secondary serving cells (SCells) may be used in addition to a primary serving cell (PCell), thus supporting flexible bandwidth assignments up to 100 MHz. Uplink Control Information (UCI), which may include HARQ acknowledgment and/or non acknowledgement (ACK/NACK) feedback and/or channel state information (CSI), may be transmitted either on a physical uplink control channel (PUCCH) resources of the PCell or on PUSCH resources available for a serving cell configured for UL transmissions.

Control information for scheduling of PDSCH and PUSCH may be sent on one or more physical data control channel(s) (PDCCH). In addition to LTE Rel-8/9 scheduling using one PDCCH for a pair of UL and DL carriers, cross carrier scheduling may also be supported by a given PDCCH; allowing the network to provide PDSCH assignments and/or PUSCH grants for transmissions in one or more other serving cells.

For a FDD LTE Rel-10 UE operating with CA, there may be one HARQ entity for each serving cell. Each HARQ entity may have up to 8 HARQ processes, e.g., one per subframe for one round trip time (RTT). Further, for the FDD LTE Rel-10 UE operating with CA, there may be more than one HARQ process active for the UL and for the DL in any given subframe. However, there may be at most one UL and one DL HARQ process per configured serving cell.

It is expected that the capacity needs of currently deployed wireless networks may continue to grow at an exponential pace as the use of wireless devices continues to explode globally. In order to boost the capacity of networks and dense cell deployments (i.e., via the use of tighter macro cell deployment or via the use of small cells), improved cell spectral efficiency may be required. Such new deployments may come at the cost of increasing the overall interference landscape. To improve the performance of such high interference deployments, previous efforts have focused on improving the CSI feedback from User Equipment (UE) in order to better enable an evolved NodeB (eNB) to select transmission techniques that are the most advantageous for each UE. For example, in Release-11 interference measurement resources in the form of CSI Interference Measurement (CSI-IM) could be introduced, enabling a network to clearly instruct each UE how to measure interference for different transmission hypotheses. Another method for improving the performance of UEs in highly interfering environments could be achieved under Enhanced Inter-Cell Interference Coordination (eICIC) techniques in Release-10. In this case, a UE served by a Pico cell could be configured with two sets of measurements. Each set of measurements could have a defined subset of subframes upon which a UE could perform CSI measurements. This could allow a network to potentially use Almost Blank Subframes (ABS) from an interfering cell in order to ensure that the UE could sometimes be served in a reduced interference environment. In Release-11eICIC was extended by using Further Enhanced Inter-Cell Interference Coordination (FeICIC). This study focused on the use of nonlinear interference cancellation receivers to mitigate strong Cell specific Reference Signal (CRS)/Primary Synchronization Signal (PSS)/Secondary Synchronization Signal (SSS)/Physical Broadcast Channel (PBCH) interference. For example, up to two interfering CRS transmissions can be cancelled at the UE by having the network indicate the resources upon which the UE should expect such interfering CRS.

In Long Term Evolution (LTE) systems, advanced UE receivers may be used to improve the performance of downlink transmission. Such advanced UE receivers may enable interference cancellation or suppression. By efficiently cancelling or suppressing interference, the Signal to Interference plus Noise Ratio (SINR) of the desired transport block may be increased and thus, higher throughput may be achieved. Some examples of advanced receivers include Minimum Mean Square Error/Interference Rejection Combiner (MMSE-IRC), Widely Linear (WL) MMSE-IRC, Successive Interference Cancellation (SIC) and Maximum Likelihood (ML).

SUMMARY

A method implemented by a Wireless Transmit/Receive Unit (WTRU) includes receiving a DeModulation Interference Measurement (DM-IM) resource, determining an interference measurement based on the DM-IM resource, and demodulating a received signal based on the interference measurement. An interference is suppressed based on the interference measurement. At least one DM-IM resource is located in a Physical Resource Block (PRB). The at least one DM-IM resource is located in a PRB allocated for the WTRU. The DM-IM resource is a plurality of DM-IM resources, the plurality of DM-IM resources form a DM-IM pattern, and the DM-IM pattern is located on at least one of a Physical Downlink Shared Channel (PDSCH) and/or an enhanced Physical Downlink Shared Channel (E-PDSCH) of at least one Long Term Evolution (LTE) subframe. The DM-IM resources are different for different Physical Resource Blocks (PRB) in the LTE subframe. The DM-IM is located in a Long Term Evolution (LTE) Resource Block (RB), and the method includes adjusting a DM-IM pattern based on at least one of a frame number associated with the LTE RB, a subframe number associated with the LTE RB, and/or an RB index associated with the LTE RB. A plurality of DM-IM resources is received, and the DM-IM resources are adjusted in respective LTE subframes based on a higher layer signaling. Locating a DM-IM resource associated with the WTRU based on a cell specific identifier associated with a cell serving the WTRU is performed.

A Wireless Transmit/Receive Unit (WTRU) includes a receiver configured to receive a DeModulation Interference Measurement (DM-IM) resource, and a processor configured to determine an interference measurement based on the DM-IM resource, and demodulate a received signal based on the interference measurement. The processor is father configured to suppress an interference based on the interference measurement. At least one DM-IM resource is located in a Physical Resource Block (PRB). The at least one DM-IM resource is located in a PRB allocated for the WTRU. The DM-IM resource is a plurality of DM-IM resources, the plurality of DM-IM resources form a DM-IM pattern, and the DM-IM pattern is located on at least one of a Physical Downlink Shared Channel (PDSCH) and/or an enhanced Physical Downlink Shared Channel (E-PDSCH) of at least one Long Term Evolution (LTE) subframe. The DM-IM resources are different for different Physical Resource Blocks (PRB) in the LTE subframe. The DM-IM is located in a Long Term Evolution (LTE) Resource Block (RB), and the processor is father configured to adjust a DM-IM pattern in a LTE Resource Block (RB) based on at least one of a frame number associated with the LTE RB, a subframe number associated with the LTE RB, and/or an RB index associated with the LTE RB. The processor is father configured to receive a plurality of DM-IM resources, and adjust a number of DM-IM resources in a respective LTE subframe based on a higher layer signaling. The processor is father configured to locate a DM-IM resource associated with the WTRU based on a cell specific identifier associated with a cell serving the WTRU.

A method implemented by a Wireless Transmit/Receive Unit (WTRU) includes receiving a Downlink (DL) information, and determining, from the DL information, whether a co-scheduling indicator indicates that a further WTRU or transmitter is co-scheduled with the WTRU. An Interfering Signal (IS) of the further WTRU or transmitter is suppressed based on the co-scheduling indicator.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 4 is a table setting forth the modulation schemes of a complex valued modulation scheme and a real valued modulation scheme according to the modulation order and/or bit width.

DETAILED DESCRIPTION

In the following detailed description, numerous specific details are set forth to provide a thorough understanding of embodiments and/or examples disclosed herein. However, it may be understood that such embodiments and examples may be practiced without some or all of the specific details set forth herein. In other instances, well known methods, procedures, components and circuits have not been described in detail, so as not to obscure the following description. Further, embodiments and examples not specifically described herein may be practiced in lieu of, or in combination with, the embodiments and other examples disclosed herein.

Example Architecture

When referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless capable and/or wired capable (e.g., tetherable) device configured with, inter alia, some or all structures and functionality of a WTRU, such as described infra; (iii) a wireless capable and/or wired capable device configured with less than all structures and functionality of a WTRU, such as described infra; or (iv) the like. Details of an example WTRU, which may be representative of any UE recited herein, are provided below with respect to FIGS. 1A-1C.

When referred to herein, the terms "evolved Node-B" and its abbreviations "eNB" and "eNode-B" may mean (i) a base station, such as described infra; (ii) any of a number of embodiments of a base station, such as described infra; (iii) a device configured with, inter alia, some or all structures and functionality of a base station or eNB, such as described infra; (iii) a device configured with less than all structures and functionality of a base station or eNB, such as described infra; or (iv) the like. Details of an example eNB, which may be representative of any eNB recited herein, are provided below with respect to FIGS. 1A-1C.

When referred to herein, the terms "mobility management entity" and its abbreviation "MME" may mean (i) an MME, such as described infra; (ii) an MME in accordance with a 3GPP LTE release; (iii) an MME in accordance with a 3GPP LTE release modified, extended and/or enhanced according to the description that follows; (iii) a device configured with, inter alia, some or all structures and functionality of any of the aforementioned MMEs; (iv) a device configured with less than all structures and functionality of any of the MMEs of (i) and (ii) above; or (iv) the like. Details of an example MME, which may be representative of any MME recited herein, are provided below with respect to FIGS. 1A-1C.

When referred to herein, the term "at least one" may mean "one or more."

Figure 1A:
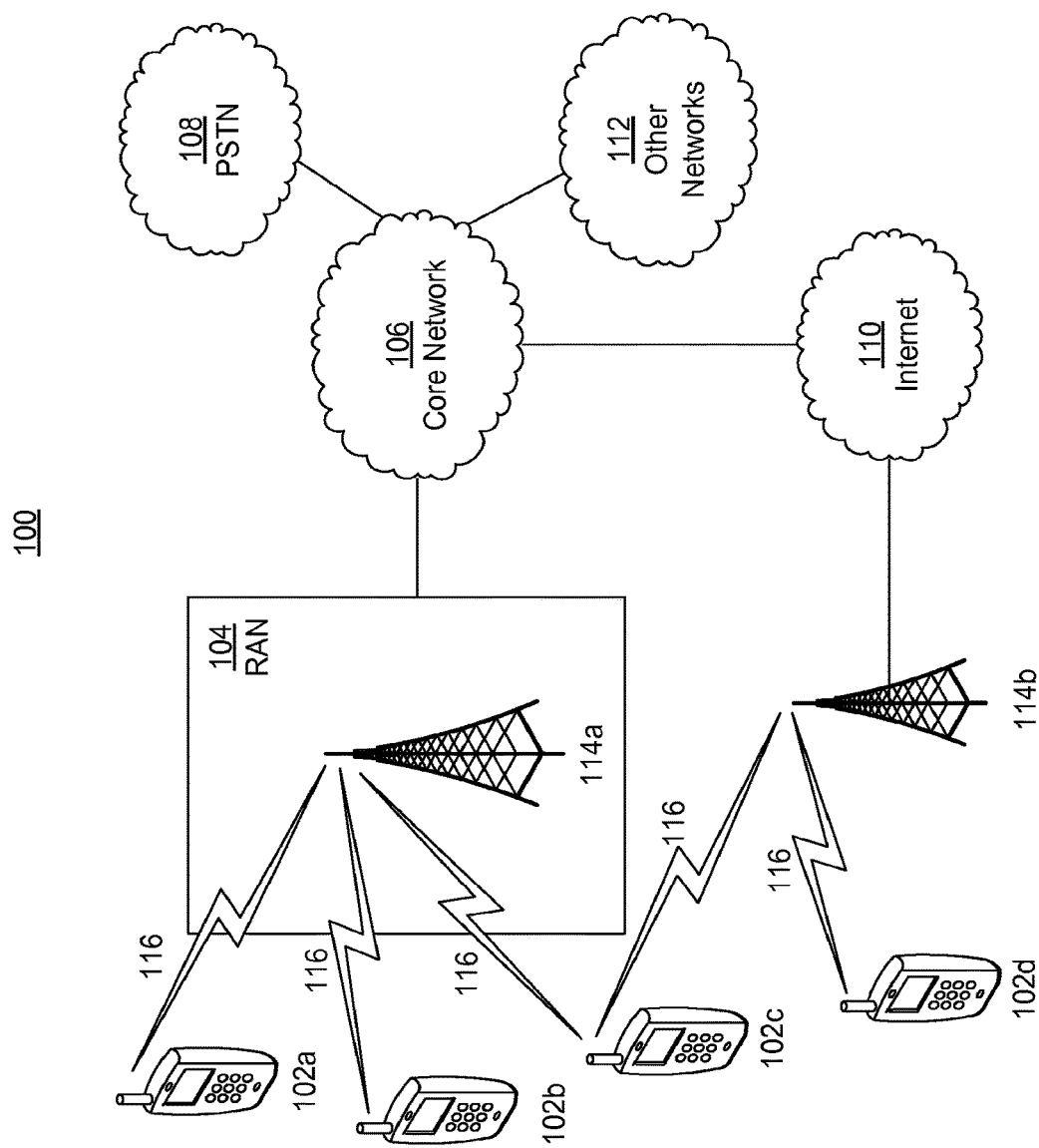
FIG. 1A is a diagram of an example communications system in which one or more disclosed embodiments may be implemented.

FIG. 1A is a diagram of an example communications system 1100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a tablet computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High Speed Packet Access (HSPA) and/or Evolved HSPA (HSPA+). HSPA may include High Speed Downlink Packet Access (HSDPA) and/or High Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
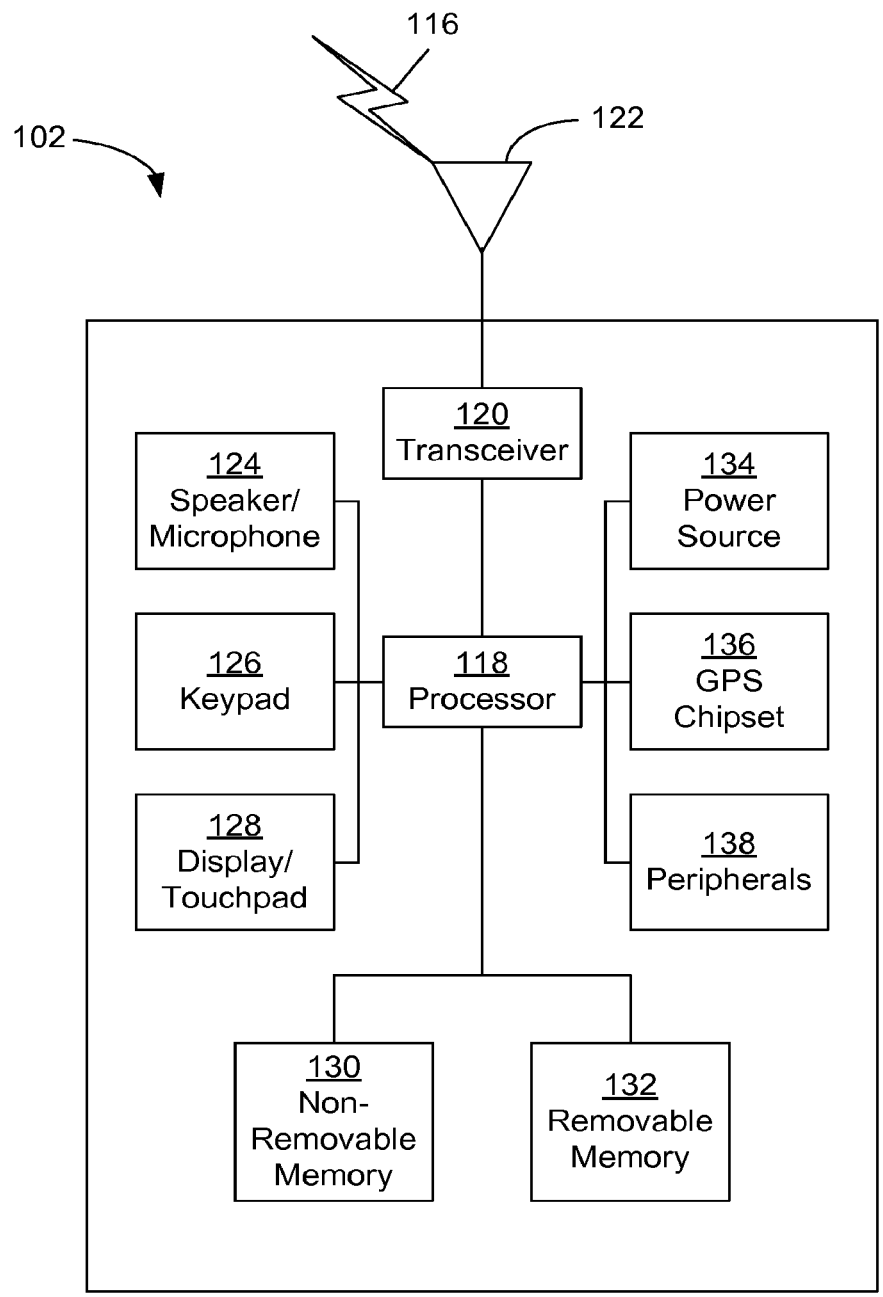
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 19, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 19 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
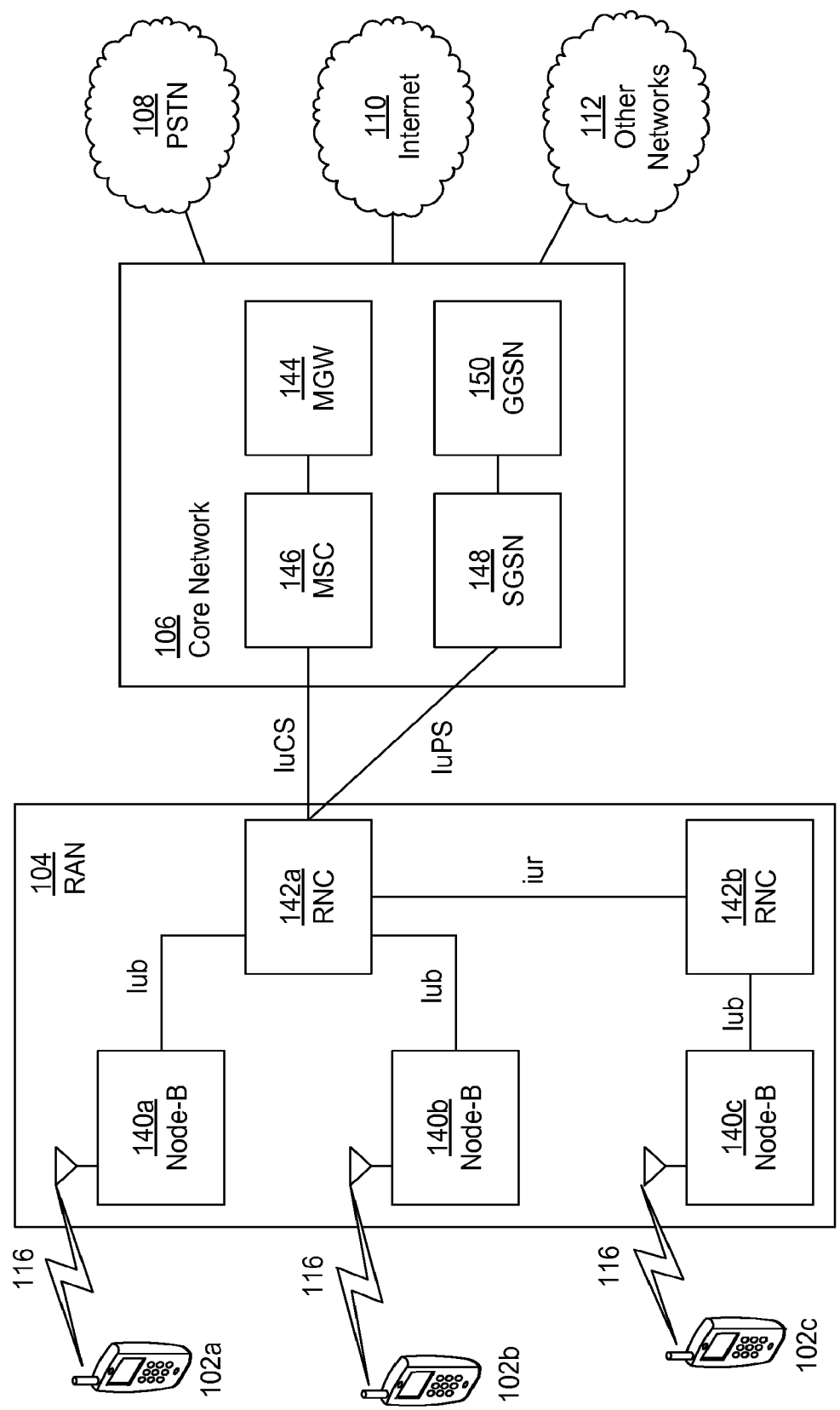
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
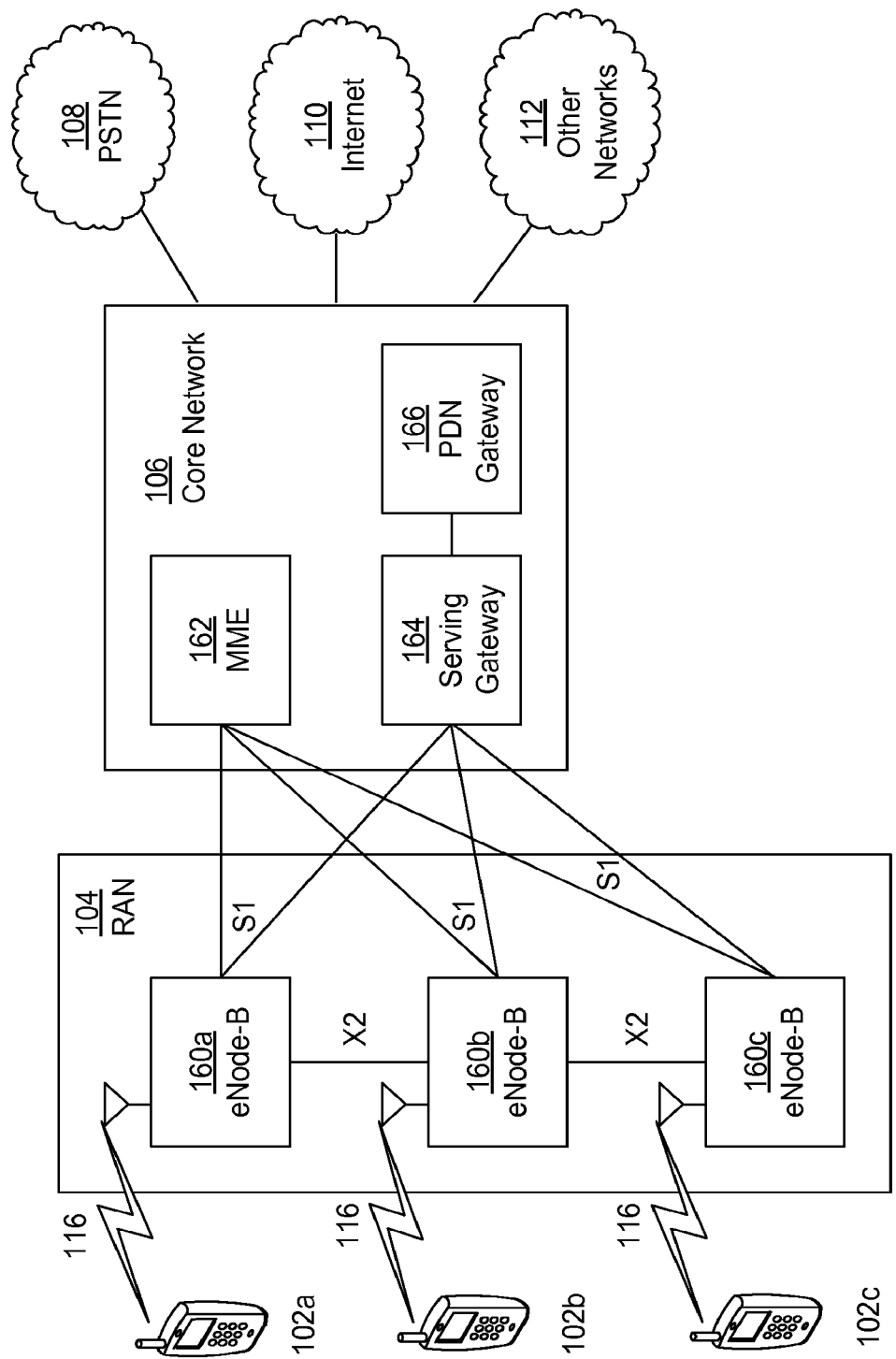
FIG. 1D is a system diagram of another example radio access network and an example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the uplink and/or downlink, and the like. As shown in FIG. 1D, the eNode-Bs 160*a*, 160*b*, 160*c* may communicate with one another over an X2 interface.

The core network 106 shown in FIG. 1D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 160*a*, 160*b*, 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 142 may also provide a control plane function for switching between the RAN 104 and other RANs (not shown) that employ other radio technologies, such as GSM or WCDMA.

The serving gateway 164 may be connected to each of the eNode Bs 160*a*, 160*b*, 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

Figure 1E:
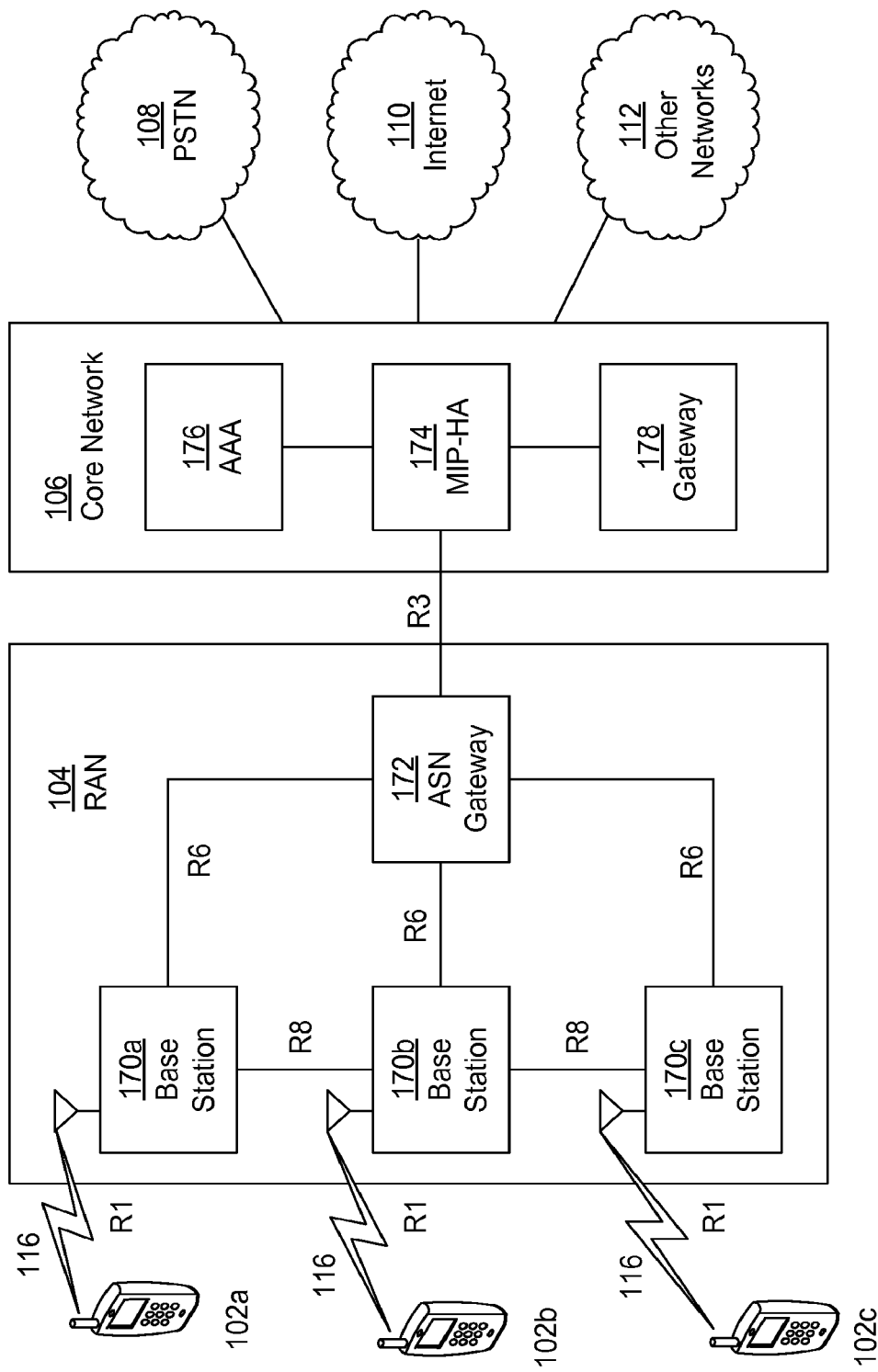
FIG. 1E is a system diagram of another example radio access network and an example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102*a*, 102*b*, 102*c* over the air interface 116. As will be further discussed below, the communication links between the different functional entities of the WTRUs 102*a*, 102*b*, 102*c*, the RAN 104, and the core network 106 may be defined as reference points.

As shown in FIG. 1E, the RAN 104 may include base stations 170*a*, 170*b*, 170*c*, and an ASN gateway 142, though it will be appreciated that the RAN 104 may include any number of base stations and ASN gateways while remaining consistent with an embodiment. The base stations 170*a*, 170*b*, 170*c* may each be associated with a particular cell (not shown) in the RAN 104 and may each include one or more transceivers for communicating with the WTRUs 102*a*, 102*b*, 102*c* over the air interface 116. In one embodiment, the base stations 170*a*, 170*b*, 170*c* may implement MIMO technology. Thus, the base station 170*a*, for example, may use multiple antennas to transmit wireless signals to, and receive wireless signals from, the WTRU 102*a*. The base stations 170*a*, 170*b*, 170*c* may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102*a*, 102*b*, 102*c* and the RAN 104 may be defined as an R1 reference point that implements the IEEE 802.16 specification. In addition, each of the WTRUs 102*a*, 102*b*, 102*c* may establish a logical interface (not shown) with the core network 106. The logical interface between the WTRUs 102*a*, 102*b*, 102*c* and the core network 106 may be defined as an R2 reference point, which may be used for authentication, authorization, IP host configuration management, and/or mobility management.

The communication link between each of the base stations 170*a*, 170*b*, 170*c* may be defined as an R8 reference point that includes protocols for facilitating WTRU handovers and the transfer of data between base stations. The communication link between the base stations 170*a*, 170*b*, 170*c* and the ASN gateway 142 may be defined as an R6 reference point. The R6 reference point may include protocols for facilitating mobility management based on mobility events associated with each of the WTRUs 102*a*, 102*b*, 102*c*.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA 144 may be responsible for IP address management, and may enable the WTRUs 102*a*, 102*b*, 102*c* to roam between different ASNs and/or different core networks. The MIP-HA 144 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 146 may be responsible for user authentication and for supporting user services. The gateway 148 may facilitate interworking with other networks. For example, the gateway 148 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 148 may provide the WTRUs 102a, 102b, 102c with access to the networks 11, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Overview

Methods, systems and apparatus for user equipment (UE) and network operation in view of a New Carrier Type (NCT) in long-term evolution (LTE) systems may be disclosed. At least some of the methods, systems and apparatus may be directed to supporting operation with the NCT, including, for example, methods, systems and apparatus for paging, cell re-selection and measurements, radio link monitoring, system information acquisition, and cell type detection.

Among the aforementioned methods, systems and apparatus is a method that may include selectively mixing a NCT subframe with one or more other subframe types in a (same) carrier. The carrier may be a NCT carrier or a legacy carrier. In certain embodiments, the legacy carrier may be defined in accordance with at least one release of 3rd generation partnership project (3GPP) technical specification(s) (TS(s)) directed to Long-Term Evolution (LTE) prior to release twelve (12) of the 3GPP TSs (collectively "3GPP LTE pre-Rel-12"). In certain embodiments, the NCT carrier may be defined according to at least one protocol different from the legacy carrier.

The NCT subframe may be, or include at least a portion of, a subframe defined according to at least one protocol different from legacy subframe types. The NCT subframe, for example, may be a CRS-less subframe, a CRS-limited subframe, a limited port CRS subframe, a Demodulation Reference Signal (DM-RS) subframe, a non-backward compatible subframe and a mixed NCT subframe.

The other subframe types may be non-NCT subframes. The non-NCT subframes may include the legacy subframe types. The legacy subframe types may be defined in accordance with 3GPP LTE pre-Rel-12. Examples of the non-NCT subframes may include a normal (e.g., UL and/or DL) subframe, a special subframe, a multimedia broadcast multicast services (MBMS) single-frequency network (SFN) (MBSFN) subframe and an ABS.

Overview of LTE Procedures

System Information Acquisition

According to 3GPP TS 36.133, section 8.1.2.2.4.1, a UE in connected mode that is configured to perform measurements on a frequency that corresponds to a neighbor cell might not (or might not be required to) read master information block(s) (MIB(s)) and/or system information blocks (SIB(s)) of neighbor cells unless the UE is explicitly instructed to read such information for associated measurement reportConfig (e.g., using an si-RequestForHO parameter). Cell global identity (CGI) detection may require acquisition of the MIB and/or the SIB1, however.

Measurements in Connected Mode

Measurements may be typically used for mobility control, for radio link monitoring and for power settings.

A UE may make a number of measurements of and/or using CRS (or common) reference signals (CRS). The UE may use the measurements to determine, for example, radio quality of one or more LTE cells. Examples of the measurements include any of a RS received power (RSRP) measurement, a reference signal received quality (RSRQ) measurement, a receive strength signal indicator (RSSI) measurement and a DL path loss (PL) estimation (which may be based on an RSRP measurement). The UE may make the measurements in accordance with requirements that specify a certain level of accuracy. In accordance with such requirements, a UE may assume that the CRS may be present in every DL subframe and at least one DL subframe may be measured per radio frame using at least those CRS. The UE may be configured with a parameter that restricts the DL subframes on which to perform measurements for a frequency of a serving cell. An example of such parameter may be measSubframePatternConfigNeigh parameter.

Layer 3 (L3) filtering may be configured per measurement quantity, e.g., per RAT type. A filtering period applied typically serves to adjust (e.g., on a sliding scale) an amount of instances a handover may occur and/or handover delay. Such filtering period may be a function of UE velocity. A short filtering period may lead to a low handover delay, but to a high handover rate. A long filtering period (e.g., longer in duration that the short filtering period) may lead to high handover delay and/or low handover rate. A higher number of samples per measurement (e.g. within a measurement gap, if configured) may improve the measurement accuracy, and may contribute to lower the rate of handover. A filter coefficient may be configured per measurement type (e.g., for a RSRP measurement, a RSRQ measurement, a RSSI measurement, DL PL estimation, etc.).

The RSRP and/or RSRQ measurements may be typically needed by the UE to detect a cell. For DL PL estimation, filtering may also be configured and applied per serving cell.

Radio Link Monitoring (RLM) and Measurements in Connected mode

For a PCell, the UE may perform radio link monitoring (RLM). The UE may do so by estimating a problem error rate for reception of a hypothetical PDCCH, including Physical Control Format Indicator Channel (PCFICH) errors. The UE may perform measurements over a 200 ms period, and may set the error rate at 2% for $Q_{in}$ and at 10% for $Q_{out}$. The UE may apply any subframe restrictions in time for RLM measurements. The UE might require at least one measurable subframe per radio frame for RLM.

Measurements and Cell Reselection

In idle mode, the UE may perform measurements of a current serving cell on which it has camped, and of neighboring cells on both (i) the same carrier frequency, e.g., intra-frequency, and (ii) different carrier frequencies, e.g., inter-frequency.

A serving eNB may provide information concerning neighboring cell information for measurements in its system broadcast information and/or via dedicated signaling, such as, for example, Radio Resource Control (RRC) signaling. The serving eNB may provide dedicated priority information (e.g., by cell list) through dedicated RRC signaling. The UE may detect and measure cells that may not be part of a provided cell list. To limit the amount of measurements that the UE has to carry out and/or to minimize battery consumption during a DRX cycle of the UE, for example, the UE may use the priorities assigned to certain frequencies when determining when to measure and which cells to measure for inter-frequency and intra-frequency neighbor cell measurements.

The UE may make neighbor measurements as follows (or as set forth in at least one of the following):

for frequencies assigned a higher priority than a current frequency, the UE may perform inter-frequency measurements on cells in that higher priority frequency;

for frequencies assigned a priority equal or lower than a current frequency, the UE may perform inter-frequency measurements after RSRP and/or RSRQ measurement(s) of the current cell fall below respective specified thresholds; and the UE may perform intra-frequency measurements after the RSRP and/or RSRQ measurement(s) of the current cell fall below respective specified thresholds.

The measurements of neighboring cells may be monitored and evaluated by the UE in idle mode, and the UE may decide to perform cell re-selection to another cell when the cell re-selection criteria are met, wherein meeting such cell re-selection criteria is based on one or more thresholds, which may be provided in system information.

DRX/Paging

The network may use a paging message to reach or communicate with the UE in idle mode. The paging message may include information that may be UE specific and/or general indicators. The UE-specific information may be and/or include, e.g., information for establishing a connection to the network. The general indicators may be and/or include, e.g., indicators for notifying the UE (and other UEs) of changes to certain broadcast information of the cell, including, e.g., earthquake and tsunami warning system (ETWS) information and/or commercial mobile alert system (CMAS) information. To minimize an amount of time the UE needs to look for a possible page, a DRX cycle and paging occasions may be assigned to the UE either through cell system information or through higher layer specified parameters. Paging information may be sent on certain subframes on a PDSCH whose resource location may be sent on a PDCCH masked with paging radio network temporary identifier(s) (P-RNTI). Given that a single P-RNTI assigned to a cell, a single paging message may be sent on the pre-assigned subframes, and such paging message may include paging information for one or more UEs.

LTE Operation Modes

In a FDD mode of operation, different carriers may be used for UL and DL transmissions, and a UE (e.g., a UE capable of full duplex communication) may simultaneously receive in the DL and transmit in the UL. In a TDD mode of operation, UL and DL transmissions may be carried on the same carrier frequency separated in time. For a given carrier, a UE operating under TDD does not simultaneously receive in the DL and transmit in the UL.

For efficient operation, some implementations of advanced receivers may require more information at the UE. For example, Successive Interference Interference (SIC) may be improved if a UE may also be aware of the parameters of the Interfering Signals (IS) (such as RB allocation, the Modulation and Coding Scheme (MCS), etc. . . . ). The network may enable such efficient interference cancellation or suppression by assisting the UE.

Network Assisted Interference Cancellation and/or Suppression (NAICS) may enhance the performance of data channels (e.g., PDSCH) as well as some control channels of interest. Some issues that may arise in the implementation of enhanced decoding schemes, for example NAICS, may include signaling features for enabling more effective and robust UE-side interference cancellation and/or suppression. This may include how such signaling may be performed, as well as what such signaling entails. Furthermore, NAICS may not be relevant under all transmission scenarios. Therefore, methods for triggering NAICS may be required.

Another issue that may arise may be how to design modulation to better enable the optimal improvement of advanced UE receivers.

Delivery of information to a receiver to support the implementation of NAICS functionality may result in significant design issues to overcome. For example, in the context of HSPA UEs and networks, downlink common control channels like High Speed Synchronization Control Channels (HS-SCCH), may be used to convey information. The information conveyed may be information about an interferer for a UE attempting to cancel data traffic channel interference on the High Speed Downlink Shared Channel (HS-DSCH). A NAICS capable UE may learn about the UE identifier of its strongest interferer and decode the HS-DSCH scheduling information for the interferer from the associated HS-SCCH for that interferer. In LTE networks a NAICS capable handset may account for the possible presence of one out of many candidate interfering UEs on the RB allocated to its DL data channel in a subframe, i.e., the PDSCH. This may be so due to differences in DL control channel design, and the flexibility of the Frequency Division Multiplexing/Time Division Multiplexing (FDM/TDM) scheduling approach. In particular, many UEs may be possible candidates for scheduling by the eNB. Any of the possible candidates may become interferers for the UE under consideration. However, decoding all DL assignment messages in a given subframe for all possible candidate interferer UEs may be an overwhelmingly complex task for a NAIC capable UE to accomplish. It may be overwhelmingly complex even if the device is aware of all other UE identifiers. Similarly, restricting the list of candidate interferers to reduce the decoding complexity for the NAICS capable UE could significantly adversely affect system throughput as a consequence of scheduling/co-scheduling limitations. Therefore, methods and procedures may be sought that could allow a NAICS capable handset to obtain information about candidate interfering UEs in a given transmission time interval. The methods and procedures may allow for low complexity implementation in the NAICS capable handset, while not limiting system performance from the base station perspective.

Possible Examples

Examples described herein may be used by a UE or a UE method in any combination to improve the decoding performance of DL channels including, but not limited to, PDSCH, PDCCH, E-PDCCH or a newly defined downlink physical channel. Corresponding methods may be performed by points within a network communicating with the UE or UE method. The examples may be effective through techniques such as interference suppression or cancellation. The term "desired information" may be used to refer to any Downlink Control Information (DCI) or higher layer data (i.e., information bits from a transport channel such as DL-SCH) that the IE may have to receive from the DL physical channels. The term "enhanced decoding scheme" may be used to generally refer to any procedure for obtaining the desired information that employs an example described herein. The terms NAIC or NAICS may also be used to refer to such procedures or enhanced deciding schemes. The term NAICS capable UE may be used to refer to a UE that may employ such any such procedure.

In some examples, the UE may determine or obtain information on at least one downlink signal, an IS. The IS may be received in the same subframe as its desired information. The UE may use the obtained information about the IS, such as its transmission parameters, to improve the probability of successful decoding of its received signal. It may use any possible interference cancellation techniques or any combination of interference cancellation techniques. This information may be referred to as IS information herein.

In some examples, the UE may perform a measurement to estimate properties of an IS received in the same subframe as its desired information. The result of the measurement may be used to improve the probability of successful decoding in the subframe through techniques such as interference suppression. The measurement may be different from interference measurements carried out for the purpose of CSI reporting (e.g., CSI-IM). The UE may be provided with a resource to perform such a measurement. The resource may be referred to as DM-IM herein.

In some examples, the UE may decode its desired information according to a different modulation scheme to facilitate the use of techniques such as interference suppression. A new downlink physical channel may be defined for such operation. For example, the UE may receive at least DL-SCH information from an enhanced PDSCH (E-PDSCH) according to physical layer processing (e.g., modulation scheme) different than for PDSCH.

In some examples, the UE may employ new procedures to support operations with the enhanced decoding scheme. According to these procedures the UE may, for example, determine whether to attempt decoding according to an enhanced decoding scheme in a particular subframe. It may also determine how to provide Hybrid Automatic Repeat Request (HARQ) feedback. The UE may also enhance functionalities such as CSI feedback to better support the enhanced decoding scheme.

Interference Suppression
DM-IM Resource
A UE May Perform Measurements of Interference on a Defined Resource, (e.g., DM-IM), for Demodulation Purposes A resource for interference measurement may be defined. A UE may measure the interference from the resource. It may use the measurement when demodulating a received signal for its desired information, for example, in a receiver such as an MMSE-IRC type of receiver. The UE may use the measurement for interference suppression.

A RE for interference measurement may be defined as a DM-IM. The UE may measure the interference. It may, for example, use the measurement for demodulation. One or more DM-IM may be located in the Physical Resource Block (PRB) pairs allocated for a UE to receive PDSCH. The UE may measure interference from the one or more of the DM-IM within the PRB pairs allocated for the UE.

The DM-IM may be defined as a null RE, i.e., a RE onto which no symbol from PDSCH, E-PDSCH or other physical channel may be mapped. When demapping REs to modulation symbols for a physical channel, the UE may assume that no symbol may be mapped to REs used for DM-IM (i.e., rate matching). The UE may also assume that puncturing is applied on coded bits corresponding to symbols that are mapped to the REs.

DM-IM Collision Handling
A DM-IM may be defined as any PDSCH RE location. One or more of the following may apply when the DM-IM collides with another signal. If a nonzero power CSI-RS RE may be overlapped with a DM-IM, the nonzero power CSI-RS RE may have higher priority. Thus, a UE may assume that nonzero power CSI-RS may be transmitted in that RE.

If a zero power CSI-RS RE may be overlapped with a DM-IM, a UE may assume that the RE may be used as a DM-IM. The UE may measure interference from the DM-IMs including a DM-IM that collides with a zero power CSI-RS RE. It may use the interference information for demodulation. Alternatively, if a zero power CSI-RS RE may be overlapped with a DM-IM, the zero power CSI-RS RE may have higher priority. Thus, the UE may not include a DM-IM colliding with a zero power CSI-RS RE for interference measurement.

If a CSI-IM RE may be overlapped with a DM-IM, a UE may assume that the RE may be used for both CSI-IM RE and DM-IM. The UE may use the RE for interference measurement for CSI feedback and/or interference measurement for demodulation.

If a Positioning Reference Signal (PRS) RE may be overlapped with a DM-IM, the PRS RE may have higher priority. A UE may assume that the RE may be used for a PRS. A UE may not include a DM-IM colliding with a PRS RE for interference measurement.

If a Primary Synchronization Signal (PSS) or a Secondary Synchronization Signal (SSS) RE may be overlapped with a DM-IM, the PSS/SSS RE may have higher priority. A UE may not include a DM-IM colliding with a PSS or SSS RE for interference measurement. Alternatively, a UE may assume that DM-IM may not be used in a PRB pair containing PSS/SSS.

Figure 2:
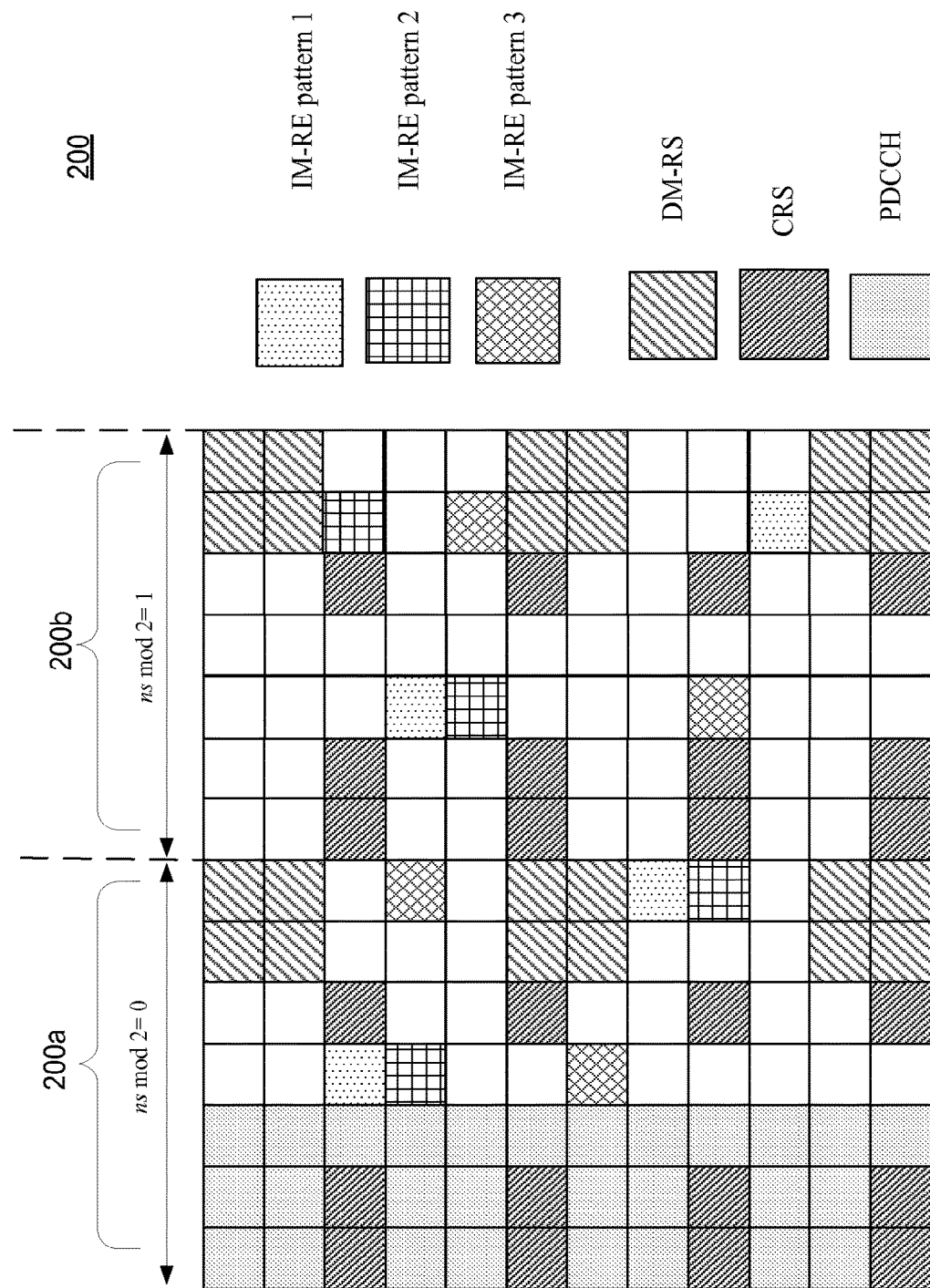
FIG. 2 is a schematic representation of a demodulation interference measurement pattern.

DM-IM Pattern
Referring now to FIG. 2, there is shown a schematic representation of a demodulation interference measurement pattern 200. The demodulation interference measurement pattern 200 may show a PRB pair, consisting of PRBs such as PRB 200a and PRB 200b. Each PRB 200a, b may include a plurality of DM-IM patterns. Any other types of symbols may be present in a PRBa, b, such as DM-RS, a CRS and/or a PDCCH. In one possible example, a fixed number of DM-IMs may be used in a DM-IM pattern 200. Multiple patterns of DM-IM pattern 200 may be defined to be orthogonal or quasi-orthogonal. DM-IM pattern 200 may include any number of Interference Measurement Resource Elements (IM-RE) patterns, such as IM-RE pattern 1, IM-RE pattern 2, or IM-RE pattern 3, as shown in FIG. 2. The IM-RE patterns 1, 2, 3 may be orthogonal. Furthermore, one or more of followings may apply.

A DM-IM pattern may be defined in the PRB pair. In general, N DM-IMs may be used per PRB pair. The N DM-IMs may be located in a distributed manner or a localized manner within a PRB pair.

The number of DM-IMs per PRB pair, N, may be predefined. Alternately, it may be configured, for example, by higher layer signaling.

Multiple DM-IM patterns which may be orthogonal may be defined. The number of DM-IM patterns may be a function of N.

One or more sets of DM-IM patterns may be defined. For a certain set of DM-IM patterns, the patterns in the set, e.g., all the patterns in the set, may have the same number, N, of DM-IMs per PRB pair. The number of patterns in the set may be a function of N. Alternately, the maximum number of patterns in the set may be a function of N.

The number of available DM-IM patterns within each DM-IM pattern set may be different. For instance, if N is large the number of available DM-IM patterns may be smaller, as compared with the DM-IM pattern types corresponding to a smaller N.

The number of available DM-IM patterns in each DM-IM pattern set may be different. For instance, if N is large, the number of available DM-IM patterns may be smaller as compared with the DM-IM pattern type corresponding to smaller N.

One or more sets of DM-IM patterns may be defined. The DM-IM patterns in a set may be mutually orthogonal in time and/or frequency location within a PRB pair. For instance, the RE locations for DM-IM pattern 1 may be mutually orthogonal with DM-IM pattern 2 in time and/or frequency location.

The DM-IM pattern(s) in a cell may be a function of at least one of cell ID, virtual cell ID, or another cell related signal or parameter.

One or more sets of DM-IM patterns may be a function of cell ID, virtual cell ID, or another cell related signal or parameter.

A set of DM-IM patterns may be split into any number of multiple subsets of DM-IM patterns. A different subset of DM-IM patterns may be used according to the cell or virtual cell. As an example, a subset of DM-IM patterns may be configured to a specific cell as a function of physical cell ID and/or virtual cell ID. There may be S subsets (or sets) of DM-IM patterns, where the subset (or set) index s=0, 1, . . . , S−1. The index may be configured as a function of the physical/virtual cell ID. For example, a modulo operation may be used to configure the subset (or set) of indexes, such as s=cell ID mod S.

A UE may be provided with or configured with, e.g., via RRC signaling, one or more sets of DM-IM patterns or parameters. The UE may determine one or more sets of DM-IM patterns from the DM-IM patterns or parameters.

A DM-IM pattern may be configured, for example, in a UE specific manner. The DM-IM pattern to be used by a UE may be configured semistatistcally via higher layer signaling such as RRC signaling or it may be configured dynamically. Dynamic configuration may be via an indication which may be in a DCI format. This format may provide a grant for the PDSCH. The grant may include the DM-IMs in the indicated pattern. For example, if K DM-IM patterns may be available, for example in general or for a given serving cell, the DM-IM pattern index k may be configured via higher layer or physical layer signaling. The value of index k may be 0, 1, . . . , K−1.

The configuration of a DM-IM pattern may include any one or more parameters that may enable the UE to determine which pattern to use, such as one or more of the following. The configuration may be an indication of which pattern set of a group of predefined or configured sets of patterns to use. The configuration may be an indication of which pattern of a predefined or configured set of patterns to use. The configuration may be the value of N. The configuration may be an indication of a value of N from a set of N values which may be known to the UE, e.g., by definition or configuration. For example, if the possible values of N are 4, 8, 16, and 32, the value of N may be indicated by two bits to select one of the 4 choices.

The DM-IM pattern may be determined in a UE specific manner. For instance, if K DM-IM patterns may be available, for example in general or for a given serving cell, the DM-IM pattern to be used by a specific UE may be a function of the Cell Radio Network Temporary Identifier (C-RNTI) of the UE. As an example, a modulo operation may be used with C-RNTI and the number of available DM-IM patterns. For example, the DM-IM pattern index k, where k may be 0, 1, . . . , K−1, may be determined by the UE from: k=C-RNTI mod K.

A DM-IM pattern may be defined within a PRB pair in a UE-specific manner. The DM-IM pattern for the UE may be defined as a function of C-RNTI. As an example, the C-RNTI may be used as an initialization parameter for a sequence generation, and the generated sequence may be used as a DM-IM pattern. The sequence may indicate the N DM-IM locations within a PRB pair. This may require a set of RE indexes for the REs for PDSCH. This may be applicable for the case of quasi-orthogonal DM-IM patterns.

A DM-IM pattern may be defined within a PRB pair in a UE specific manner. The DM-IM pattern for the UE may be defined as a function of C-RNTI and a physical and/or virtual cell ID. A combination of C-RNTI, cell ID and/or virtual cell ID may be used as an initialization parameter for a sequence generation. The generated sequence may be used as the DM-IM pattern. This may be applicable for the case of quasi-orthogonal DM-IM patterns.

Furthermore, the DM-IM pattern may be a function of the frame number and/or subframe number, and/or a PRB index. This may provide a randomization mechanism for intercell interference.

PDSCH Reception with DM-IMs

A DM-IM pattern in a PDSCH or E-PDSCH PRB pair allocated to a UE may be defined, configured, or otherwise determined by the UE. Based on this the UE may measure interference from one or more of the DM-IMs that may be present within the PRB pair. It may use the measurement(s) in demodulation, for example to suppress the interference. The UE may take into account the priorities of the DM-IMs and any other signal types which may collide with the DM-IMs in the PRB pair. The UE may use this to determine whether to include or exclude an RE in the interference measurements.

A UE may receive an indication whether the DM-IMs may be present in a PRB to be decoded by the UE. This may be referred to herein as a DM-IM-ON-OFF indication. The DM-IM-ON-OFF indication may be provided to the UE, e.g., by the eNB. It may be provided to the UE by higher layer signaling such as RRC or Medium Access Control (MAC) layer signaling, or via physical layer signaling, such as in a DCI format. A DM-IM-ON-OFF indication may be included in a DCI format. This may provide a grant for the PDSCH or E-PDSCH. A DM-IM may be included in the indicated pattern.

The ON or OFF indicated by a DM-IM-ON-OFF indication may apply to PDSCH allocations for the UE in or beginning with the next PDSCH allocation, or a future PDSCH allocation. For example, a DM-IM-ON-OFF received by a UE in a subframe n may indicate ON (e.g., DM-IMs may be present) or OFF (e.g., DM-IMs may not be present) in one or more of the following: PDSCH PRB pairs in subframe n, PDSCH PRB pairs beginning in subframe n, PDSCH PRB pairs in subframe n+k, for example n+4, or PDSCH PRB pairs beginning in subframe n+k, for example n+4.

In a given subframe in which PDSCH may be allocated to the UE, the UE may take into account the DM-IM-ON-OFF indication applicable to the subframe in determining whether DM-IMs may be present in PRB pairs of its allocated PDSCH. If the applicable indication indicates a DM-IM is ON, the UE may make and use DM-IM measurements as described herein. If the applicable indication indicates the DM-IM may be OFF, or if the UE has not received an indication that it may be ON, the UE may not make and/or use the measurements.

In addition to, or instead of, including a DM-IM-ON-OFF indication in the DCI format, an indication of which DM-IM pattern to use may be included in the DCI format. The pattern indication may itself be used to indicate ON or OFF, e.g., one value may mean OFF. Alternatively, the use of a DCI format, which may include the pattern indicator, may mean ON or OFF. The use of the one that does not include the indicator may mean OFF.

The DM-IM may be used for all or a subset of downlink transmission modes. If a dynamic indication for DM-IM may not be used, downlink transmission modes defined in previous 3GPP releases (i.e., Release-8/9/10/11) may use DM-IM for PDSCH demodulation. This may be true because an additional bit field in its DCI format may not be required. However, if a dynamic indication for DM-IM may be used, such as for indication of a DM-IM pattern or a DM-IM-ON-OFF indication, a new downlink transmission mode for NAIC may be defined.

In one possible example, a new downlink transmission mode (e.g., TM-11) may be defined for the enhanced decoding (or NAIC) scheme, with a new DCI format (e.g., DCI format 2E) and a bit field for DM-IM configuration and/or DM-IM-ON-OFF indication. For example, the bit field in the DCI format may include the configuration of the DM-IM pattern which may be as described earlier herein.

In one possible example, the DM-IM pattern may be indicated in the DCI format associated with PDSCH transmission in the subframe. If K DM-IM patterns are available, e.g., for a cell, $\lceil \log_2 K \rceil$ bits may be used in the DCI format associated with PDSCH or E-PDSCH transmission. This may indicate which DM-IM pattern may be used to demodulate the corresponding PDSCH. If a UE receives this indication, the UE may measure interference in the RE locations which may be indicated in a DM-IM pattern. The measured interference information may be used for demodulation in the subframe.

The enhanced decoding scheme may be supported with a limited transmission rank. For example, a normal transmission mode (e.g., TM-10) may support up to rank 8, according to the eNB antenna configuration. Moreover, the enhanced decoding scheme may support up to a lower rank, such as rank 1 or rank 2. Thus, the field describing antenna ports and rank in the new DCI format may have a reduced size, compared to other DCI formats such as 2C or 2D.

One or more of the following may apply to the interference measurements.

If multiple PRB pairs are allocated for a UE, the UE may assume that the interference level may be different from one PRB pair to another. Thus, the interference measurement should not be averaged across the PRB pairs allocated for the UE.

PRB bundling may be used for interference measurement. Thus, a UE may assume that the interference may be the same within the PRB bundling size (where the bundling size may be larger than 1 PRB pair). Accordingly, a UE may average the interference over multiple PRB pairs. In the latter case, the multiple PRB pairs may be consecutive in the frequency domain. In an example, the PRB bundling may be activated or deactivated via higher layer signaling. In this case, the bundling size may be predefined as a number of consecutive PRBs. In another example, the PRB bundling may always be used in a specific transmission mode supporting NAIC.

PRB bundling may be used for interference measurement. Therefore, a UE may assume that the interference may be the same within the PRB bundling size (where the bundling size may be larger than 1 PRB pair). Alternately, a UE may average the interference over multiple PRB pairs. In the latter case, the multiple PRB pairs may be consecutive in the frequency domain. In an example, the PRB bundling may be activated or deactivated via higher layer signaling. In this case, the bundling size may be predefined as a number of consecutive PRBs. In another example, the PRB bundling may be used in a specific transmission mode supporting NAIC.

If PRB bundling may be used for interference measurement, a subset of PRB pairs within the bundled PRB pairs may contain only DM-IMs. Therefore, a UE may measure interference from the PRBs containing DM-IM, and use the interference information for other PRB pairs within bundled PRB pairs.

In one possible example, DM-IMs and/or the new downlink transmission mode may be (e.g., may only be) used in a subset of subframes. One or more of the following may apply.

A DCI format used for NAIC (e.g., DCI format 2E) which includes a bit field for DM-IM configuration or an indication (e.g., DM-IM pattern index) may be (e.g., may only be) used in the subset of subframes which may contain DM-IMs.

The subset of subframes and/or radio frames supporting NAIC, or which may include DM-IMs, may be configured via higher layer signaling, the upper layer signaling may be dedicated signaling or broadcast signaling (e.g., MIB or SIB-x).

The subset of subframes supporting NAIC, or which may include DM-IMs, may be configured among the MBSFN subframes. A subset of the MBSFN subframes may be used as NAIC subframes.

The subset of subframes supporting NAIC, or which may include DM-IMs, may be configured among the ABS subframes. A subset of the ABS subframes may be used as NAIC subframes.

NAICS

In one possible example, the existence of co-scheduled UE information may be carried in a DCI format used for NAIC. For example, a co-scheduling indicator (or interference indicator) may be used to inform a UE whether there may be a co-scheduled UE. The indicator may be one bit.

The UE may estimate an IS by measuring DM-RS. The DM-RS may be used for the IS. The estimate may be based on an indication of co-scheduled interference and/or detection of energy level above a threshold. The threshold may be a predetermined threshold.

One or more of following may apply. In a given subframe with a PDSCH allocation for a certain UE, there may be a (e.g., at least one) co-scheduled UE, or co-scheduled interference. It (they) may be indicated by the co-scheduling indicator being activated (e.g., indication bit=1). In this case the certain UE may perform energy detection of the antenna ports not allocated for the certain UE. If the certain UE may determine that a specific antenna port has higher power than a threshold, the certain UE may consider that antenna port to have an interference signal and may try to suppress the interference.

In a given subframe with a PDSCH allocation for a certain UE, there may be a (e.g., at least one) co-scheduled UE, or co-scheduled interference, which may be indicated by the co-scheduling indicator being activated (e.g., indication bit=1). In this case the certain UE may perform energy detection of the antenna ports not allocated for the certain UE. If the certain UE may determine that a specific antenna port has higher power than a threshold, the certain UE may consider that antenna port to have an interference signal and may try to suppress the interference.

In a given subframe with a PDSCH allocation for a certain UE, there may not be any co-scheduled UE, or co-scheduled interference, which may be indicated by the co-scheduling indicator being deactivated (e.g., indication bit=0) or not being present. In this case, the certain UE may skip performing energy detection of the antenna ports not allocated for the certain UE. In order to allow energy detection based interference blind detection, orthogonal reference signals (antenna ports) may be (or may need to be) used for the transmission mode for NAIC.

If there may be a co-scheduled UE (e.g., at least one) or co-scheduled interference, and/or if the co-scheduling indicator may be activated, RE locations (e.g., all RE locations) for two CDM groups of DM-RS ports 7~14 may be reserved. The RE locations for the two CDM groups may be rate matched around, or punctured for, PDSCH transmission. There may not be any co-scheduled UE or co-scheduled interference, and/or the co-scheduling indicator may be deactivated. In this case the CDM group (e.g., only the CDM group) containing the DM-RS port used for PDSCH transmission may be rate matched around, or punctured for, PDSCH transmission. Based on knowledge of whether there is any co-scheduling, the UE may account for the corresponding rate matching or puncturing when decoding the PDSCH. Knowledge of whether there is any co-scheduling may be indicated by the co-scheduling indicator. The DM-RS port and the antenna port may be used interchangeably.

Figure 3:
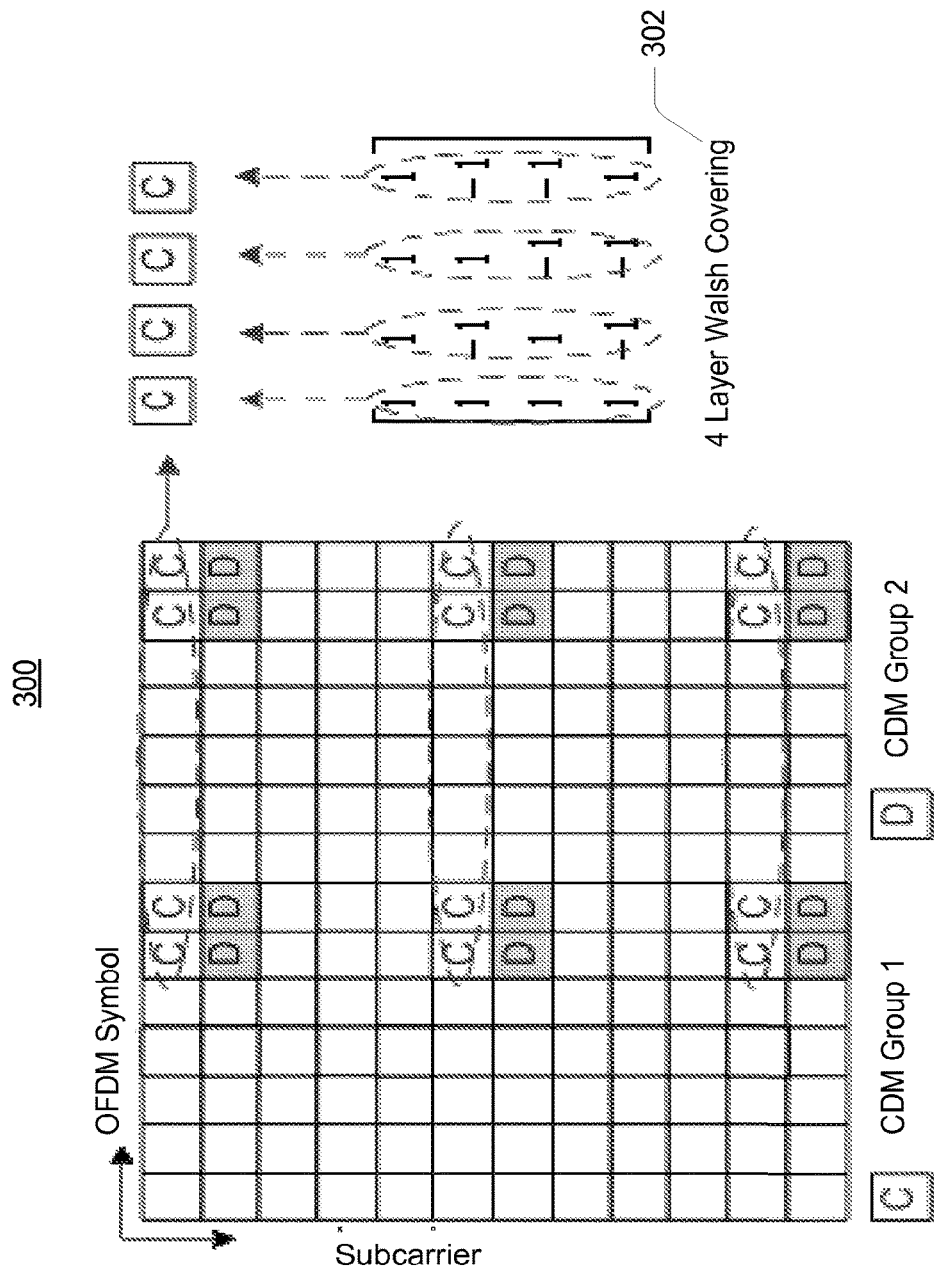
FIG. 3 is a schematic representation of the RE locations for two CDM groups of DM-RS ports.

For example, FIG. 3 shows a schematic representation of a pattern 300 including RE locations for two CDM groups, CDM group 1 and CDM group 2 of DM-RS ports 7~14. The CDM group 1, indicated as Cs in pattern 300, contains DM-RS ports {7, 8, 11, 13}. The CDM group 2, represented as Ds in pattern 300, may contain DM-RS ports {9, 10, 12, 14}. As an example, DM-RS port 7 may be used for PDSCH transmission, and the co-scheduling indicator may be activated. Under these circumstances the RE locations for both CDM groups 1 and 2 may be rate matched around, or punctured for, PDSCH transmission and reception. Moreover, the RE locations for the CDM group 1 may be rate matched around, or punctured for, PDSCH transmission and reception if the co-scheduling indicator may be deactivated. When both CDM groups are rate matched around or punctured, the UE may perform energy detection on the CDM group 2 antenna ports. The energy may be used to determine if there may be interference.

If there may be a (e.g., at least one) co-scheduled UE or co-scheduled interference and/or if the co-scheduling indicator may be activated, a UE may assume that there may be co-channel interference in the same CDM group in which the DM-RS port for the UE may be located. The UE may perform energy detection for the DM-RS ports located in the same (e.g., only in the same) CDM group.

There may be a (e.g., at least one) co-scheduled UE or co-scheduled interference, and/or if the co-scheduling indicator may be activated. Under these circumstances a UE may assume that there may be co-channel interference in the same CDM group in which the DM-RS port for the UE may be located. The UE may perform energy detection for the DM-RS ports located in the same (e.g., only in the same) CDM group.

There may be a (e.g., at least one) co-scheduled UE or co-scheduled interference, and/or the co-scheduling indicator may activated. Under these circumstances, the DM-RS Scrambling ID (SCID) may set to a predefined value such as 0 or 1.

In another possible example, the information regarding the existence of one or more co-scheduled UEs, and the number of co-scheduled UEs (and/or layers), may be carried in a DCI format. For example, the DCI format may be a DCI format used for an enhanced decoding scheme. A UE may be informed of the number of interfering antenna ports and/or other co-scheduling information. One or more of following may apply. The number of interfering antenna ports may be indicated within a full set or a restricted set, such as {1, 2, 3, 4}. For a restricted set case, an n-bit (e.g., 2-bit) indicator may be used to inform the UE of the number of interfering antenna ports. If a restricted set is used, higher layer signaling may configure the subset. For example, a transmission mode which is not used for the enhanced decoding scheme may support up to a 8 layer transmission. The full set may indicate 7 layers. Thus, the number of interfering antenna ports may be one of {1, 2, 3, 4, 5, 6, 7}. Moreover, the restricted set may indicate a subset of the number of interfering antenna ports such as {1, 2}. A 4 layer example 302 may be shown in pattern 300.

The restricted set may be useful for reducing the control signaling overhead. In this case eNB may not schedule more than two interfering antenna ports.

Use of Modulation Scheme

A real-valued modulation may be used in order to increase the interference rejection capabilities at a UE receiver. The MMSE-IRC and WL-MMSE-IRC receivers may perform better as the degrees of freedom increase at the UE receiver. Additionally, real-valued modulation may double the degrees of freedom, since the two orthogonal domains, namely real and imaginary, may be further exploited to reject interference. M-ary Pulse Amplitude Modulation (PAM), as an example but without limitation to any type of modulation, may be used as a real-valued modulation. In order to keep the same spectral efficiency, each complex-valued modulation scheme may have a corresponding real-valued modulation scheme.

Referring now to FIG. 4, there is shown a table 400 setting forth a complex-valued modulation scheme, and a real-valued modulation scheme, according to a modulation order and/or a bit width. Thus, the complex-valued modulation 402, the real-baled modulation 404, and the modulation order $Q_m$ 406 may be shown for four cases in table 400. The four cases may include the single bit case 408 [b(i)], the pairs of bits case 410 [b(i), b(i+1)], quadruplets of bits case 412 [b(i), b(i+1), b(i+2), b(i+3)] and hextuplets of bits case 414 [b(i), b(i+1), b(i+2), b(i+3), b(i+4), b(i+5)].

Figure 5:
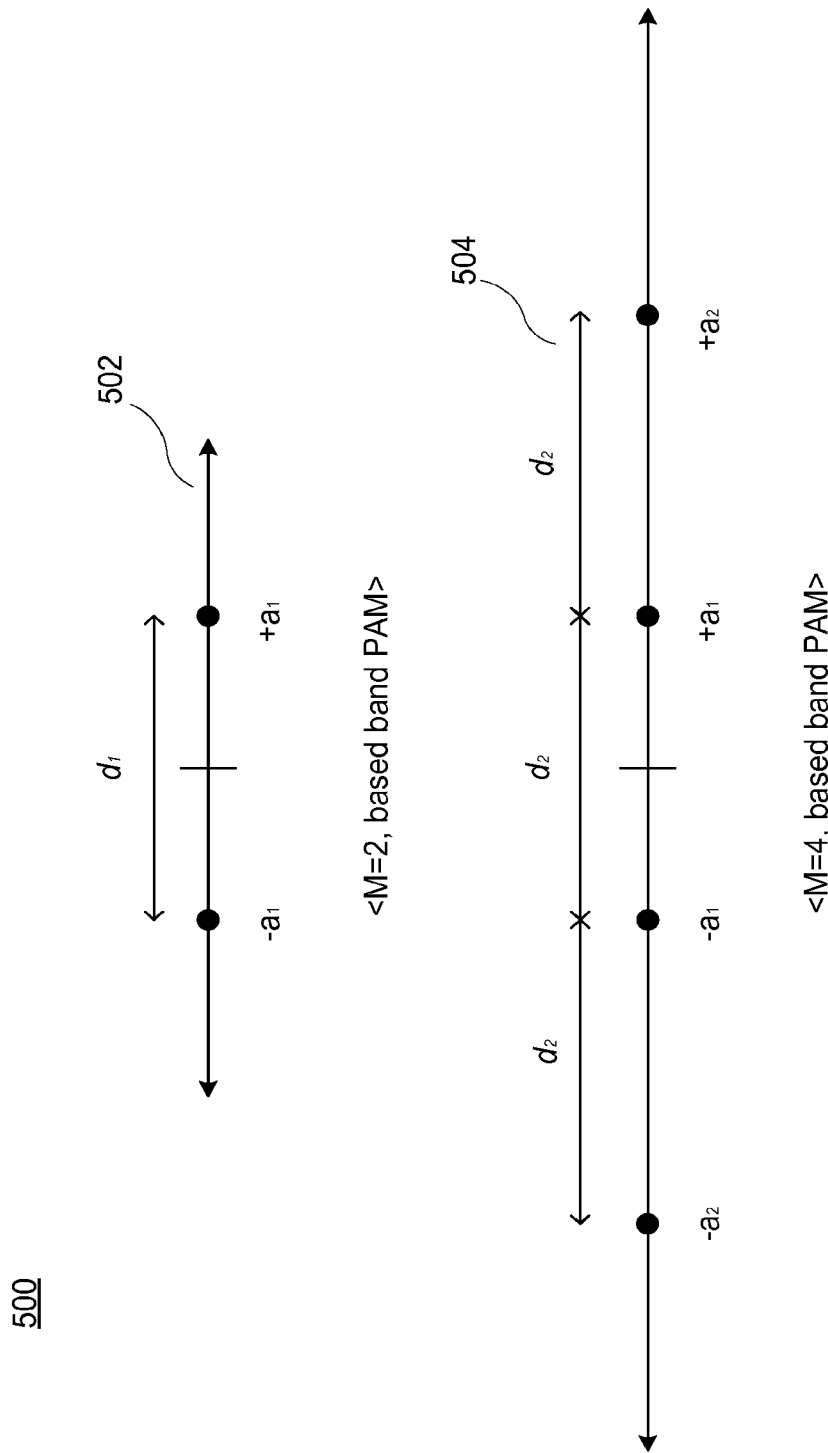
FIG. 5 is an example of an M-ary PAM for the M=2 and M=4 cases.

Referring now to FIG. 5, there is shown a schematic representation 500 of an M-ary PAM, for the M=2 case 502 and the M=4 case 504. The PAM of representation 500 may be defined in, for example, only the real domain. The distances between any two adjacent constellations may be the same in a specific M-ary PAM.

The UE may determine the type of modulation scheme used from a configured mode of operation, or from operation, or from the value of a field in the received DCI. In one possible example, a different set of modulation schemes may be used for downlink transmission according to a mode of operation. The downlink transmission may include physical channels such as PDSCH, (E)PDCCH, PBCH or a new channel (e.g., E-PDSCH). In one of these cases, one or more of following may apply.

Two modes of operation may be defined, for example a normal mode and an enhanced decoding (or NAIC) mode. The names of the modes may be defined in any way. For the two modes of operation, at least one of followings may apply.

A UE may be configured with a mode of operation by higher layer signaling or informed via a broadcasting channel. In another example, a dynamic indication may be used to indicate whether a UE may perform in a normal mode or an NAIC mode. Alternatively, a subset of physical resources including subframe, radio frame, and/or PRBs may be configured for use as a specific mode of operation.

A mode of operation may be predefined according to the physical resources, for example UE-ID, cell-ID and/or a specific system parameter. For instance, a subset of subframes, radio frames, and/or PRBs may be predefined for use in an NAIC mode of operation. Additionally, any other subframes, radio frames, and/or PRBs may be used as the normal mode of operation. A UE may receive a downlink transmission in the physical resources, which is predefined to be used as an enhanced decoding mode of operation. Under these circumstances, the UE may receive the downlink transmission with an enhanced decoding mode. In another example, a subset of C-RNTI may be reserved for the enhanced decoding mode operation. Furthermore, if a UE may be configured with a C-RNTI in the subset, the UE may receive downlink transmission with enhanced decoding mode of operation.

Other modes of operation may be used for a subset of downlink transmissions. In an example, the NAIC mode of operation may only be applicable for PDSCH and EPDCCH. Thus, the modes of operation may be used only for PDSCH and EPDCCH. The normal mode of operation may be used for another downlink transmission. In another example, the NAIC mode of operation may be used only for the PDSCH.

In the normal mode of operation, a UE may assume that the modulation schemes for all or a subset of downlink transmissions may be based on a complex-valued modulation scheme. For example, it may be one of BPSK, QPSK, 16QAM, and 64QAM. A MCS level may be explicitly indicated for a specific downlink transmission such as PDSCH. Thus, a UE may assume the complex-valued modulation corresponding to the MCS level for demodulation.

In the enhanced mode of operation, a UE may assume that the modulation schemes for all or a subset of downlink transmissions may be based on a real-valued modulation scheme. If a MCS level may be explicitly indicated for a specific downlink transmission, such as PDSCH, a UE may assume the real-valued modulation corresponding to the MCS level for demodulation.

The enhanced decoding or NAIC mode may be defined as a downlink transmission mode (e.g. TM-11). Additionally, the real-valued modulation may be used for the NAIC mode only. Therefore, if a UE may be configured with NAIC mode, the modulation scheme for each modulation order in a MCS table may be based on a real-valued modulation.

The transmission mode used for NAIC may be the same as a specific downlink transmission mode using complex-valued modulation. An exception may be for using real-value modulation. The transmission mode used for NAIC may support rank-1 transmission.

In another possible example, complex valued modulation and real-valued modulation may be mixed. Furthermore, both modulations may be a part of a MCS table. Thus, an eNB scheduler may select any of modulation schemes dynamically. It may indicate an MCS level in DCI format. In this case, one or more of following may apply.

The MCS table size may double so that complex-valued modulation may be used for an MCS index 0 to 31. Additionally, real-valued modulation, for example, may be used for the MCS index 32 to 63. Therefore, a 5 bit MCS field in a DCI format may be increased to a 6 bit MCS field.

In an MCS table, the real-valued modulation may be introduced for a specific modulation order. For instance, 4-ary PAM may be introduced for the modulation order 2 (Qm=2) in the MCS table. The specific modulation order may be replaced with real-valued modulation.

In an MCS table, for each modulation order, a subset of MCS indexes may be replaced with real-valued modulation. For example, if an MCS index 0~9 is used for modulation order 2 with QPSK, a subset of MCS index 0~9 (e.g., MCS index 0~3) may be replaced with 4-ary PAM modulation. The remaining MCS index 4~9 may continue to use Quadrature Phase Shift Keying (QPSK) modulation.

Determining IS Information

Possible examples that a UE may employ for determining the IS information that is used in an enhanced decoding scheme may be described. The UE may use the IS information in different ways to improve the probability of success of decoding its desired information. In some examples, the UE may utilize a limited amount of IS information to estimate the IS in the decoding process. For example, it may use the RB assignment and the modulation order. In other examples, the UE may fully decode the IS (at the bit level) to completely remove its contribution to the total received signal.

General Examples

In some possible examples, without limitation, the UE may extract IS information through post processing at the receiver. This may be done without any network assistance (blind estimation). The extracted IS information may include the modulation order of the interferer, for example BPSK, QPSK, QAM16, QAM64, etc. Additionally it may include the Transmission Mode (TM) of the interferer, for example Transmit Diversity (TM2), Open-Loop Spatial Multiplexing (TM3), Closed-Loop Spatial Multiplexing (TM4), etc. It may also include the transmission power of the interferer, for example the ratio of PDSCH Energy Per Resource Element (EPRE) to a cell-specific reference symbol EPRE.

In some possible examples, the UE may obtain IS information using a priori knowledge regarding the IS. For instance, in the case where the IS includes transmissions over physical channels such as E-PDCCH, PDCCH, PCFICH, PHICH or PBCH, the UE may determine the following parameters. It may determine the precoding at the transmitter, for example, it may determine space-frequency block coding may be the baseline transmit diversity for PDCCH, PCFICH, PHICH & PBCH. It may also determine the transport block size. For example it may determine the total number of coded bits transmitted on PBCH in a single subframe may be fixed at 480. Additionally, the UE may also determine the modulation order, for example the modulation order for control channels may be QPSK. A UE-specific RS scrambling index associated with EPDCCH may also be determined. For example, $n_{SCID}^{EPDCCH}$ for EPDCCH may be fixed and may be equal to 2. UE specific RS antenna ports associated with EPDCCH may also be determined. For example, $n_{SCID}^{EPDCCH}$ for EPDCCH may be fixed and may be equal to 2.

In some examples, the UE may obtain explicit IS information through physical or higher layer signaling from the network. For instance, at least one of the following parameters may be indicated for an IS: MCS assigned to the interferer, transport block size(s) of the interfering data packet, spatial a precoder used at the transmitter for the interferer, for example the Precoder Matrix Indication (PMI) index in TM2, TM3 and TM4 for LTE systems, the actual RB assignment of the interferer, the transmission Rank of the signal intended for the interferer, the transmission Mode of the interferer, the UE-specific RS scrambling index of the interferer, the identity of the interfering UE, and/or the C-RNTI.

Configuration of IS Information for Multiple Potential ISs

In a dynamic DL traffic environment, an eNB may not have drastic scheduling limitations imposed on it. For example, an eNB may serve multiple UEs, each with DL data at similar times. In such a scenario, the scheduler may be able to determine the UEs that may be scheduled with specific resources based on metrics. This may ensure the optimal quality of service and/or throughput that may be achieved for the UEs. When used in combination with frequency selective scheduling, an eNB may dynamically determine whether the UEs should be paired for Multi User MIMO (MU-MIMO). It may also determine which UEs may be paired. Furthermore, in some deployments, it may be possible for a cell to be informed of other UEs scheduled in specific resources. However, a cell may not have control over such scheduling.

To achieve such scheduling flexibility, a UE may be expected to cancel and/or suppress interference from at least one of potentially multiple IS. At any time, a UE may expect to cancel and/or suppress possibly a single (or possibly a few) IS. However, the IS may change dynamically over different subframes, It may potentially also change over different PRB resources in the same subframe.

To enable a UE to be able to cancel and/or suppress interference from different IS, a UE may be pre-configured, via higher layers (e.g., RRC signaling), with a list of possible IS, as well as necessary parameters. Such a configuration may include a list of potential IS, as well as an IS index. Furthermore, for a different IS, the UE may be preconfigured with parameters that may correspond to parameters semi-statically configured for another UE for which the IS may be destined. For instance, such parameters may include (assuming the IS corresponds to a PDSCH transmission in TM10 for another UE) at least one of the following.

The parameters may include PDSCH RE mapping and quasi-co-location. This may be a list of values for a 'PDSCH RE Mapping and Quasi-Co-Location Indicator' field. It may also be a parameter set for each value. A parameter set for these values may include: crs-PortsCount-r11 (or crs-PortsCount-r12) and or crs-FreqShift-r11 (or crs-FreqShift-r11). This may be used to indicate where a UE assigned the IS assumes CRS and therefore may have no transmission of data. It may include mbsfn-SubframeConfigList-r11 (or mbsfn-SubframeConfig-r12). This may be used to indicate the subframes in which a UE that is assigned the IS may assume a Multicast-Broadcast Single-Frequency Network (MBSFN). The parameter set for these values may also include: csi-RS-ConfigZPId-r11 (or csi-RS-ConfigZPId-r12). This may be used to indicate the resources where a UE that receives the IS assumes ZP CSI-RS. It may therefore assume no transmission of data. It may also include pdsch-Start-r11 (or pdsch-Start-r12). This may be used to indicate the OFDM symbol where a UE assigned the IS assumes data transmission may begin. It may also include qcl-CSI-RS-configNZPId-r11 (or qcl-CSI-RS-ConfigNZPId-r12). This may be used to indicate the CSI-RS resource that may be quasi co-located with PDSCH antenna ports where a UE assigned with the IS would expect transmission.

The parameters which may be semi-statically configured for another UE for which the IS may be destined may also include the possible values of $n_{ID}^{DMRS,i}$. They may also include the mapping of n to $n_{SCID}^{DMRS,i}$ and/or search spaces that may be used for the DCI of the IS. The search spaces may include UE-specific search spaces. They may also include common search spaces. The search spaces may be for PDCCH and/or EPDCCH. The parameters may also include EPDCCH configurations for one or more of the IS. They may also include an RNTI value to be used when decoding the PDSCH of the IS. It may also include any other ZP and/or NZP CSI-RS configuration that a UE assigned with the IS may assume contains no transmission of data.

In addition, a number of parameters may be provided for each IS. For example, without limitation, a set of subframes may be provided where the UE may expect an IS to potentially be present. Additionally, a set of PMIs that may be used for the transmission of such an IS may be provided.

The UE May Obtain IS Information by Decoding a DCI Containing the DL Assignment Corresponding to the IS The IS index may be used by the network to dynamically indicate to a UE what IS (if any) a UE may assume for proper interference cancelling and/or suppressing. For example, in a DCI assigning DL data for a UE, a new field (for example, 3 bits or any other number of bits) may indicate to the UE the IS index of an IS. One code point may correspond to the absence of any IS. Based on the presence and/or the value of such an IS index, a UE may decode the DCI of such an IS to determine the appropriate DL assignment of the IS. This may be done by using the parameters pre-configured with the IS index. The presence and/or the value of such an IS index may also enable the UE to perform interference cancellation and/or suppression.

In another example, a UE may not be pre-configured with the parameters of the DCI of each IS. Instead, in this example, each DCI may also include a bit field indicating what IS index it may be intended for. Therefore, a UE may blindly decode all appropriate DCIs until it successfully determines the DL assignment for the IS that it is indicated in its own DCI.

In another example, each IS may also be tied to some parameters of the DL transmission for the UE. For example, if a UE receives DCI in a specific search space, it may assume that a specific IS may be present during that transmission. A possible parameter that may implicitly inform a UE which IS to consider may include one of more of the following. It may include a search space used for the DL assignment for the UE. It may also include specific parameters of the DL assignment, such as MCS, PMI, DM-RS ports, Virtual Cell Identity (VCID), PDSCH RE Mapping and/or Quasi-Co-Location Indicator field. It may include the use of PDCCH or EPDCCH. A parameter of the EPDCCH transmission may be included. Additionally, the timing of the DL assignment (e.g., the subframe) may be included.

There may also be an IS index that indicates to a UE that it should expect high interference. Or, there may be a flag in the DCI of the DL assignment for the UE. However, the interference may not be from one of the pre-configured IS. There may also be an IS index that that may indicate to a UE that it should not expect interference from any pre-configured IS. Or, there may be a flag in the DCI of the DL assignment for the UE. Alternately, it may indicate that Single User MIMO (SU-MIMO) transmission may occur in the subframe.

A UE capable of handling interference may blindly detect its own DL assignments. It may also blindly detect those corresponding to the IS on a given subframe. In order to reduce the complexity of blind decoding attempts, the UE may employ one or a combination of all or some of the following schemes.

The UE may attempt to search for its own DL assignment and those of the IS on the same set of Evolved Control Channel Elements/Control Channel Elements (ECCEs/

CCEs). The UE may be expected to monitor for DL assignments. The set of candidate control channels formed by ECCEs/CCEs may also be known as a search space in LTE systems. Accordingly, in some or all of the subframes, the UE may attempt to simultaneously decode multiple EPDCCHs/PDCCHs in the UE-specific search space at each aggregation level. If the detected CRC of the DCI message checks using the identity of the interferer, the UE may declare that the interferer's DL assignment may be successfully decoded. This may be done using the RNTI and/or other parameters of the interferer.

The UE may attempt to blindly detect the DL assignments intended for interferers in a different search space than its own UE-specific search space. According to this scheme, the UE may first identify the search space of the interfering UE, for example, using the information regarding the identity of the interferer provided by the network and/or the subframe number. It may also attempt to search for EPDCCH/PDCCH intended for the interferer. It may also check the corresponding CRC against the identity of the interferer.

The search spaces for the victim UE and any interferers may partially overlap. This may limit the number of blind decoding attempts at the UE. Alternatively, the number of ECCEs/CCEs candidates and/or aggregation levels in the search spaces for which the UE may be expected to monitor for DL assignments intended for the interferer(s) may be restricted by the network. Thus, the UE may conduct fewer blind decoding attempts on other search spaces possibly containing the DL assignments for the interferer(s) than that of its own. This may be accomplished by searching on a subset of ECCEs/CCEs candidates in each search space.

The UE May Obtain the Location of the DCI Containing the Assignment of the IS from an Explicit Indication Contained in the DCI Containing its Own Assignment In one possible example, the UE may be explicitly indicated the enhanced control channel elements (ECCE's). This may be where the DL assignment of the IS may be found. This method may further relieve processing requirements. For instance, the UE may be explicitly indicated at at least one of a starting ECCE index, and/or an aggregation level, to reduce the number of possible candidates. This may reduce the number of possible candidates to a single candidate. This indication may be contained in the DCI containing the assignment for the UE. Alternately, it may be contained in another DCI containing NAICS information. The NAICS information may be decoded in the same or in a previous subframe.

In a case of EPDCCH monitoring, the UE may be configured with two EPDCCH-PRB-sets. The UE may monitor the sets. These may include EPDCCH candidates corresponding to their own DL assignment on the first EPDCCH-PRB-set. They may also include the EPDCCH candidates. The EPDCCH candidates may be intended for the interferer on the second EPDCCH-PRB-set. Moreover, each EPDCCH-PRB-set may be configured for either localized or distributed EPDCCH transmission. For example, from the UE's perspective it may be beneficial that the UE receive its own EPDCCH on the EPDCCH-PRB-set configured for localized EPDCCH transmission. It may also be beneficial that the UE receive the EPDCCH of the interferer on the EPDCCH-PRB-set configured for distributed transmission. This approach may further improve the EPDCCH detection performance at the UE's receiver. This may be the case, for example, if no beamforming is applied on the interferer's EPDCCH transmission.

For a UE configured for EPDCCH monitoring, the UE may explicitly receive one or a combination of the following parameters. The parameters may correspond to the interferer's EPDCCH configuration from the network. The parameters can include, without limitation, the number of EPDCCH-PRB-sets, the number of PRB pairs constituting each EPDCCH-PRB-set, the PRB pairs corresponding to each EPDCCH-PRB-set, the EPDCCH transmission mode for each EPDCCH-PRB-set (distributed or localized), the EPDCCH starting position, and/or the EPDCCH Format, or EPDCCH ID for each EPDCCH-PRB-set i, i.e., $n_{ID,i}^{EPDCCH}$ for $i \in \{0,1\}$.

Furthermore, the UE may implicitly derive the information related to the interferer's EPDCCH configuration. It may use a mathematical formula. The mathematical formula may be a function of the UE's EPDCCH configuration. For example, for each EPDCCH-PRB-set, the UE may derive a combinatorial index r'. The index r' may correspond to the PRB indices constituting EPDCCH-PRB-set of the interferer. The derivation may be performed by applying an offset to the configured parameter resourceBlockAssignment-r11. The configured parameter resourceBlockAssignment-r11 may indicate a combinatorial index r corresponding to the PRB indices constituting an EPDCCH-PRB-set of its own. According to another example, the UE may derive the number of EPDCCH-PRB-sets. Additionally, the UE may derive the number of EPDCCH-PRB sets. It may derive the number of PRB pairs corresponding to each EPDCCH-PRB-set of the interferer. The number of PRB pairs may be derived according to some predetermined values. With regard to an EPDCCH starting position of the intra-cell interferer, the UE may assume that this parameter may be the same as its own.

For a UE configured to monitor EPDCCH, for each EPDCCH-PRB-set, the UE may use the parameter set indicated by the higher layer parameter re-Mapping QCLConfigListId-r11 for determining the EPDCCH RE mapping and EPDCCH antenna port quasi co-location of the intra-cell interferer(s).

In the case of inter-cell interference mitigation and/or cancellation, the UE may explicitly receive, for example, one, or a combination of some of, or all of, the following parameters from the network. It may explicitly receive the number of CRS antenna ports for PDSCH RE mapping. It may explicitly receive the CRS frequency shift for PDSCH RE mapping. It may explicitly receive the MBSFN subframe configuration for PDSCH RE mapping. It may explicitly receive the zero-power CSI-RS resource configuration(s) for PDSCH RE mapping. It may explicitly receive the PDSCH starting position for PDSCH RE mapping. It may explicitly receive the CSI-RS resource configuration identity for PDSCH RE mapping. These parameters may be received for determining the EPDCCH RE mapping and/or the EPDCCH antenna port quasi co-location corresponding to the inter-cell interferer(s).

In one possible example, a NAICS capable UE may obtain IS information for at least one interfering UE by means of a common DL signaling message. It may use a group C-RNTI to identify the DL signaling message as carrying information for the purpose of NAICS. For example, the common DL signaling message carrying information for the purpose of NAICS may be sent as DCI on a DL common control channel such as PDCCH or EPDCCH.

By way of another example, a group C-RNTI assigned to the common DL signaling message may carry information for the purpose of NAICS. It may serve to decode the signaling message. It may be signaled from the network to one or more UEs. For example, a NAICS capable UE may be assigned one or more group C-RNTI used to identify DL signaling messages carrying information for the purpose of NAICS. The number of such group C-RNTIs to be decoded may be subject to configuration by the network. It may also be subject to UE capabilities. If a UE signals that it may be capable of supporting simultaneous decoding for up to 2 interferers, the network may choose to configure the NAICS capable handset to decode for 1 or for 2 interferers.

A UE that has a group C-RNTI may attempt to decode a corresponding DL control channel. It may decode for the possible presence of the DL signaling message. The DL signaling message may be in subframes that were determined to be candidates for NAICS. Depending on UE capabilities and system configuration, these subframes or transmission time intervals may include all or only a subset of them. Relevant subframes or transmission time interval candidates for decoding of the DL signaling message by a NAICS capable UE may alternatively, or in conjunction, be derived by a UE. They may be derived through a rule that does not require decoding for the presence of the DL signaling message in all subframes.

The later approach may be particularly advantageous. It may reduce the need for a NAICS capable UE to determine the presence of interferers. This may be useful in cases where subframes offer only limited flexibility in terms of sending scheduling information. It may also be useful where PDSCH allocations are limited. For example, it may be useful in LTE TDD special subframe configurations.

In one possible example, a NAICS capable UE may decode a DL signaling message containing IS information. It may perform the decoding in subframes or transmission time intervals subject to the condition that it may be actually scheduled DL data.

For example, a NAICS capable UE may attempt to decode for the presence of PDSCH DL assignment messages on a DL common control channel, such as PDCCH or EPDCCH. In these channels the DL assignment message may contain scheduling information for the UE under consideration. If the UE has determined that it has DL data on PDSCH scheduled by the network in the subframe or transmission time interval, it may then attempt to decode a DL signaling message carrying information for the purpose of NAICS.

The later approach may be particularly advantageous if a NAICS capable UE may only decode scheduling information for an interferer on an as needed basis. This may reduce decoding complexity for a NAICS capable UE. This may reduce the complexity. It may avoid the decoding of information about interferers in subframes when the UE under consideration determines there may be no DL data to be received.

Different implementations for the above described approach may be possible. For example, a NAICS capable UE may first and/or exclusively decode a PDCCH or EPDCCH for the presence of a first DL assignment message. The first DL announcement message may announce its DL data on PDSCH using its assigned unicast C-RNTI. It may proceed decoding for the presence of a second DL signaling message with the group C-RNTI for NAICS purposes if the first DL assignment message is found. In another embodiment, the NAICS capable handset may decode the PDCCH or EPDCCH for the presence of either the first or the second DL message simultaneously. However, the UE receiver for processing of the PDSCH may then be configured as a function of the resulting decoding result. If DL data is not determined to be present, any possibly decoded second DL signaling message for NAICS purposes may be discarded. If DL data may be present in that subframe the NAICS capable handset may take the information obtained from the second DL signaling message into account for configuring the receiver. Whether the DL data is present may be determined from reception of the first DL assignment message, The UE May Obtain IS Information, Such as the Identity of an IS, from a DCI Encoded in a PDCCH or E-PDCCH Separate from Its Own Assignment In one possible example, a NAICS capable UE may obtain IS information for at least one interfering UE by means of a sequential decoding procedure.

In one step, a NAICS capable UE may determine the presence of at least one interferer. It may make the determination by decoding a first DL signaling message containing NAICS information. In another step, the UE may use the information obtained through the DL signaling message to derive IS information for the interfering UE. The NAICS capable UE may also demodulate and decode its PDSCH in the subframe or transmission time interval. This may be done by taking into account the assistance information obtained in the foregoing steps.

In one example technical realization, and as one exemplary embodiment, the network may configure a group of M NAICS capable UEs. The UEs may decode for the presence of a common DL signaling message on PDCCH or EPDCCH. It may do this by using a group RNTI, e.g., NAICS RNTI. The M NAICS capable UEs may be configured by the network with a list of $N_1, N_2, N_M$ C-RNTI's. The list of C-RNTI's for a UE may correspond to a set of N possibly interfering UEs. A UE under consideration may be scheduled for DL data on PDSCH in a given subframe or transmission time interval. In one step, in the subframes, the base station may schedule some L UEs for DL data. Correspondingly it may issue a number L of DL assignment messages for the scheduled UEs on PDCCH or EPDCCH. The base station may schedule both legacy UEs and UEs that support NAICS. In addition, the base station may send the NAICS DL signaling message using the NAICS group C-RNTI. The NAICS DL signaling message may contain a list of sequential indices for the NAICS capable UEs to identify their strongest interference. For example, the NAICS capable UEs may be configured with 4 C-RNTI's of candidate interfering UEs. The payload of the NAICS DL signaling message may be a concatenation of 2 bit index values pointing to these. For example, the first 2 bits in the message may identify the strongest interferer for the first NAICS capable UE. The next 2 bits may identify the strongest interferer for the second NAICS capable UE, and so on. A NAICS capable UE may decode the PDCCH or EPDCCH. If the NAICS DL signaling message may be decoded using the NAICS group C-RNTI, it may use its corresponding index value. It may use the index value to obtain the actual C-RNTI of the UE from its network configured list. In a further step, once the NAICS capable UE obtains the actual C-RNTI for the interfering UE, it may decode DL scheduling information on PDCCH or EPDCCH for that UE.

This approach may be advantageous in that any NAICS capable device may decode only for one additional DCI, i.e., the NAICS signaling message, in subframes where it may be scheduled DL data. Moreover, when the network configures the M NAICS capable UEs with a list of $N_1, N_2, \ldots, N_M$ C-RNTIs, respectively, there may be no limitation of scheduling flexibility. This may mean that a NAICS capable UE only decodes a single DL signaling message. This may allow it to derive the identity of an interferer. As a consequence, the UE complexity necessary to support NAICS may be kept low. Furthermore, full flexibility and throughput gains due to scheduling may be possible. In addition, legacy UEs may be scheduled as before. For example, the legacy UEs may be allocated anywhere. NAIC capable handsets may be able to attempt IC/IS in the same way as for newer equipment.

Based on an approach described herein, alternative realizations may be envisioned. For example, NAICS capable UEs may be split into different groups, and they may be assigned to monitor and decode different NAICS DL assignment messages. Both the strongest and second strongest interferers may be identified for a NAICS capable UE. The interferers may be identified through the NAICS DL signaling message. Additionally, the DL signaling message may contain index values for the monitoring UEs that have DL data. The DL data may be scheduled in the subframe or transmission time interval under consideration. Furthermore, the NAICS DL signaling message may contain other information to aid the decoding UE derive scheduling information for a subframe.

Physical Layer Procedures with Enhanced Decoding Scheme

Conditions for Use of IS Information in a Subframe

A UE May Use an Enhanced Decoding Scheme for Decoding a DL Channel in a Subframe if Certain Conditions May Be Met, Such as Receiving an Indication in DCI A UE may attempt to decode on a DL physical channel using an enhanced decoding scheme in a specific subframe if at least one of a subset of conditions is met. If at least one of the conditions is not met the UE may attempt decoding using a legacy decoding scheme.

The enhanced decoding scheme may involve decoding DL information using at least one of: IS information to cancel or suppress interference, a new modulation scheme (e.g. real-valued modulation), a real-valued modulation scheme or another scheme facilitating removal of interference, and/or an interference measurement such as DM-IM for demodulation purposes.

A subset of conditions may be taken from at least one of the following. The UE may be configured to use a transmission mode in which an enhanced decoding scheme may be used for the DL physical channel. This may be a newly defined transmission mode (e.g. TM-11), and/or an enhanced decoding or NAIC mode. Another condition in the subset of conditions may the condition where the subframe for which the decoding takes place is part of a semi-statically configured subset of subframes. An enhanced decoding scheme may be used in the subframes. Additionally, the UE may be configured with IS information applicable to the subframe according to a semi-static configuration. Further conditions may include a case where the subframe for which the decoding takes place is a certain type of subframe. For example, the UE may use the enhanced decoding scheme in normal subframes and/or in MBSFN subframes.

Another condition may be a case wherein a physical RB in which the desired signal is decoded is a subset of, or overlaps with, a set of semi-statically configured physical RBs. Enhanced decoding may be used for the set of semi-statically configured physical RBs. In another case, a UE may receive DCI applicable to the reception of the DL channel in the subframe, for instance a DL assignment in E-PDCCH. This may contain an indication that an enhanced decoding scheme can be used or not used. This may also be a condition in the subset of conditions. For instance, the DCI may contain an IS information field, for which a code point indicates that no IS information should be used.

Other conditions may include a case wherein a UE may decode at least one E-PDCCH or PDCCH. The E-PDCCH or PDCCH may contain IS information applicable to the subframe. The information may be received in the same or a previous subframe. For instance, the UE may use IS information from an E-PDCCH containing a DL assignment for a C-RNTI other than its own (e.g., for another UE), if configured to gain IS information from assignments intended for the C-RNTI. This may possibly apply even if the UE does not receive DCI for its own assignment in the subframe. An example of this may be the case of an SPS assignment. The IS information received in a subframe may indicate that IS information received in a previous subframe is not applicable. For instance, the UE may decode an E-PDCCH containing a dynamic assignment for another C-RNTI that may override a previously received SPS assignment for the subframe.

A subframe for which decoding takes place may be a certain type of subframe. For example, it may be a type of subframe wherein the UE may use only an enhanced decoding scheme in normal subframes. It may use only an enhanced decoding scheme in MBSFN subframes.

Additionally, the physical RBs in which the desired signal is decoded may be a subset, or overlap with, a set of semi-statically configured physical RBs for which enhanced decoding it to be used.

In another such condition the UE may have received DCI applicable to the reception of the DL channel in the subframe (for instance, a DL assignment in E-PDCCH) containing an indication that an enhanced decoding scheme may be used or not used. For instance, the DCI may contain an IS information field, for which one of the code points indicates that no IS information should be used.

In another such condition, a UE may have decoded at least one E-PDCCH or PDCCH containing IS information applicable to the subframe (which may be received in same or previous subframe). For instance, the UE may use IS information from an E-PDCCH containing a DL assignment for another C-RNTI than its own (e.g., for another UE). The IS information may be used if the UE is configured to gain IS information from assignments intended for this C-RNTI. Possibly, this may apply even if the UE does not receive DCI for its own assignment in this subframe, such as in case of a Semi-Persistent Scheduling (SPS) assignment.

The IS information received in a subframe may indicate that IS information received in a previous subframe may not be applicable. For instance, the UE may decode an E-PDCCH containing a dynamic assignment for another C-RNTI that may override a previously received SPS assignment for this subframe.

Provision of HARQ Feedback

In one example, a UE may provide HARQ feedback pertaining to a DL assignment in a subframe wherein the timing may depend on a condition. The condition may be whether IS information is used or configured to be potentially used, in the subframe in which the DL assignment may be received, or (ii) whether the UE is configured to operate using IS information.

The use of IS information in decoding PDSCH assignments may increase the processing requirements at the receiver. To relax peak processing requirements, and thus hardware complexity, it may be beneficial to increase the latency between the reception of PDSCH and the transmission of HARQ feedback pertaining to the PDSCH.

In one example, the latency of HARQ feedback may be semi-statically configured. It may be independent of whether IS information is used in a particular subframe. For instance, in the case of an FDD modulation scheme, HARQ feedback may be provided in subframe n+n0 (where n0 may be, e.g., 5 or 6). This may occur when the UE may be semi-statically configured to operate according to a certain transmission mode for which IS information may be used, in a case of a TDD modulation scheme. HARQ feedback may be provided in subframe n+n0 where n0 would depend on the subframe index n and the subframe configuration. However, it may be the same or different (e.g. larger) than the corresponding value used in a case where another transmission mode (not using IS information) may be configured.

In another example, the latency of HARQ feedback may depend on whether IS information is configured to be potentially used in a specific subframe according to a semi-static configuration. This may be true regardless of whether it is actually used in the subframe. For instance, the UE may be configured to potentially use IS information in subframes 0, 1, 2, 4, 5, 6 and 9 of the frame. However, it may not use IS information in subframes 3, 7 and 8. In this case, the HARQ information for the first group of subframes may be provided in an UL subframe. For example, it may be provided 5 subframes later. The HARQ information for the second group of subframes may be provided in an UL subframe, for example, 4 subframes later. In UL subframes where HARQ feedback for more than 1 DL subframe may be provided, HARQ information of the more than 1 DL subframe may be bundled or multiplexed. For instance, bundling may take place in the time domain or between transport blocks of the same subframe.

In another example, the latency of HARQ feedback may depend on whether IS information is used in a specific subframe, for instance according to a subset of conditions outlined in the previous section.

The number of HARQ processes may be increased when the UE may be configured to operate according to a transmission mode where IS information may be used. This may guarantee full resource utilization in a time when the HARQ feedback latency may be increased.

UE Assistance to Trigger NAICS

It may be desirable to limit the potential signaling cost associated with indicating to a UE the amount of IS it may expect. Therefore, NAICS may be performed in cases where a UE's performance may be improved with appropriate interference cancelling and/or suppressing.

A UE may indicate to its serving cell that it may be a victim of high interference. It may thus indicate that the serving cell should trigger NAICS. In CSI feedback, a new feedback report may indicate high interference to the network. A simple bit flag may perform such a victim indication. In another example, the report may provide additional parameters of the IS, such as PMI and or timing (i.e., subframe) of the IS.

In another example, upon feeding back a NACK, a UE may also include a new bit flag indicating the presence of high interference. This may require the serving cell to trigger NAICS. In another example, an eNB, upon reception of multiple NACKS and/or upon determination of a low SINR by a UE, may autonomously decide to trigger NAICS and to configure the UE with IS configurations.

In another example, such a feedback report may also be used to indicate that interference may no longer be debilitating. It may, thus, indicate that NAICS may no longer be required. For example, a UE configured via higher layers with a set of IS may inform its serving cell if it determines that one or more of the IS does not actually adversely affect the performance of the UE.

CSI Reporting

A UE may be configured with new CSI processes, with the intent of reporting interference. Such modified CSI processes may be configured for the UE with limited CSI feedback reporting. For example, the UE may provide a single feedback report composed of a single bit (or set of bits) indicating whether it may experience high interference in such a CSI process. In another example, only RI and/or CQI may be fed back. In another example, the PMI may also be fed back. However, in the feedback report the meaning of PMI may be to indicate to the network the PMI value (or values) that may impede a UE's performance the most.

In another example, CSI feedback may be enhanced such that for every PMI a UE recommends for its desired signal, it may also include a worst partner PMI. The interpretation of such a worst partner PMI may indicate to the serving cell that a transmission on such a PMI may require NAICS. Alternatively, the interpretation of such a worst partner PMI may indicate that interference on such a PMI could not be mitigated even with NAICS. In another example, the UE may feedback a best partner PMI. Such a PMI may not require NAICS. Alternatively, the best and/or worst partner PMIs may be a set of PMIs. This may possibly provide more flexibility for the scheduler.

In another example, a UE may report multiple RIs and/or CQIs for each band of a CSI process. One RI and/or CQI may inform the serving cell of the channel quality without NAICS, and another RI and/or CQI may inform the serving cell of the possible channel quality with NAICS. The RI and/or CQI of the possible channel quality with NAICS may be calculated with the assumption that the strongest inter-cell interference signal is cancelled or suppressed. In order to calculate the RI and/or CQI without the strongest inter-cell interference, the strongest inter-cell interference signal power may be obtained from one or more of CRS, PDSCH, CSI-IM, and CSI-RS of the strongest interfering cell in one or more subframe. The strongest inter-cell interference signal power may be measured in the subframe containing CSI-RS if a UE is configured to measure from a CSI-RS. Alternatively, the strongest inter-cell interference signal power may be measured over multiple subframes.

In another example, a UE may report RI and/or CQI to the serving cell with NAICS if the UE is configured to perform NAICS receiver and the UE may report RI and/or CQI to the serving cell without NAICS if the UE is configured with a transmission mode without NAICS. Alternatively, a UE may report RI and/or CQI to the serving cell with NAICS if the UE is provided with full or partial IS information via higher layer signaling and the UE may report RI and/or CQI to the serving cell without NAICS if no IS information is provided to the UE.

Thus, a UE may perform measurements of interference on a defined resource (e.g., DM-IM) for demodulation purposes. The UE may estimate an IS from measuring demodulation reference signals used for the IS. This may be based on an indication of co-scheduled interference and/or detection of energy level above a threshold.

The UE may determine the type of modulation scheme used from a configured mode of operation. It may also make the determination from the value of a field in the received DCI. The UE may obtain IS information by decoding a DCI containing the DL assignment corresponding to the IS. The UE may obtain the location of the DCI containing the assignment of the IS from an explicit indication contained in the DCI containing its own assignment. The UE may obtain IS information, such as the identity of an IS, from a DCI encoded in a PDCCH or E-PDCCH separate from its own assignment. The UE may provide HARQ feedback pertaining to a DL assignment in a subframe whose timing depends on whether IS information is used, or configured to be potentially used, in the subframe in which the DL assignment may be received, or whether the UE is configured to operate using IS information.

Figure 6:
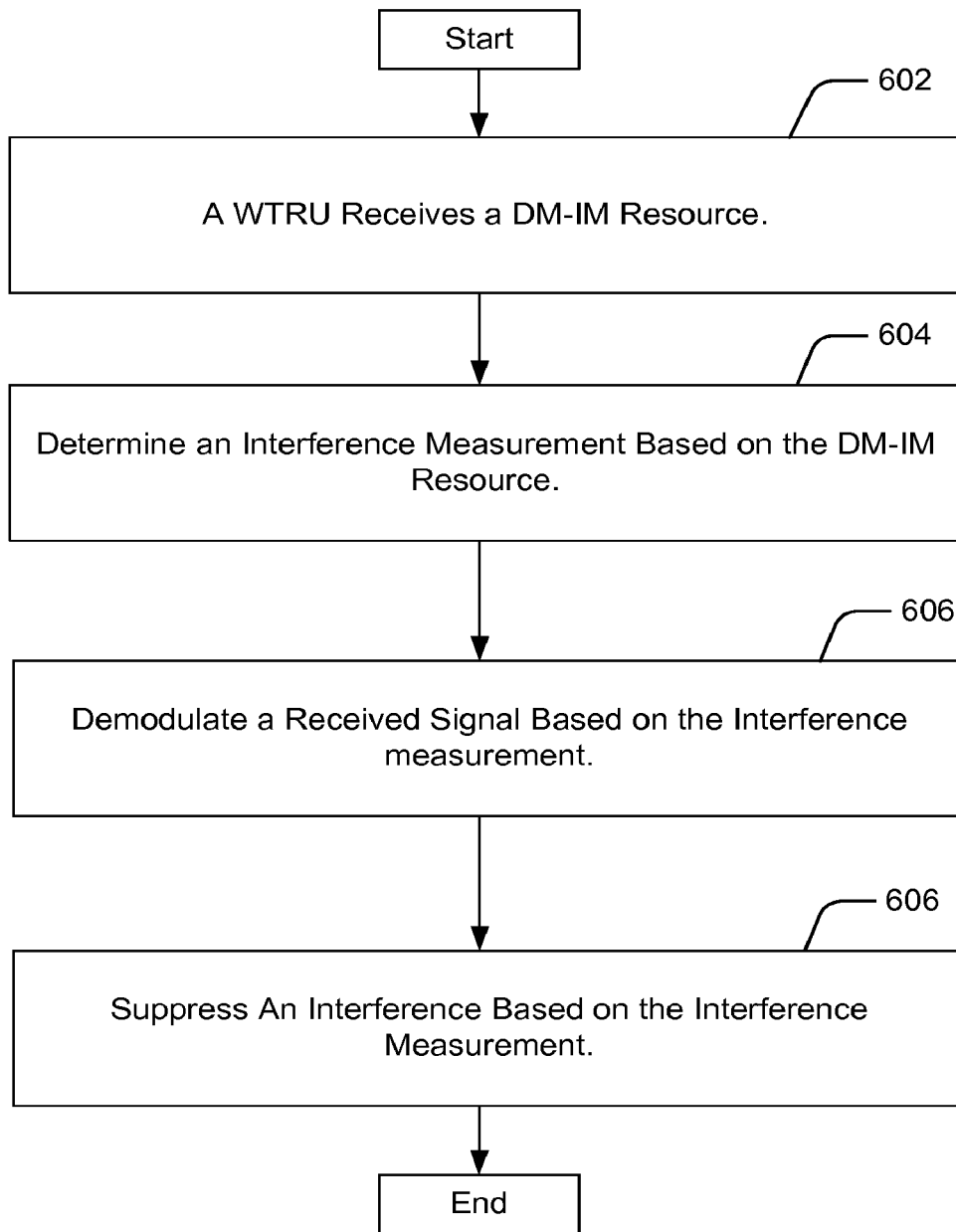
FIG. 6 is a flow diagram of an interference suppression process which may be performed in accordance with the present invention.

Referring now to FIG. 6, there is shown a flow diagram of an interference suppression process 600 for suppressing interference in a communication system. In interference suppression process 600 a WTRU may receive a DM-IM resource as shown in block 602. An interference measurement may be determined based on the DM-IM resource, as shown in block 604. A received signal may be demodulated based on the interference measurement as shown in block 606. As shown in block 606 an interference may be suppressed based on the interference measurement.

Figure 7:
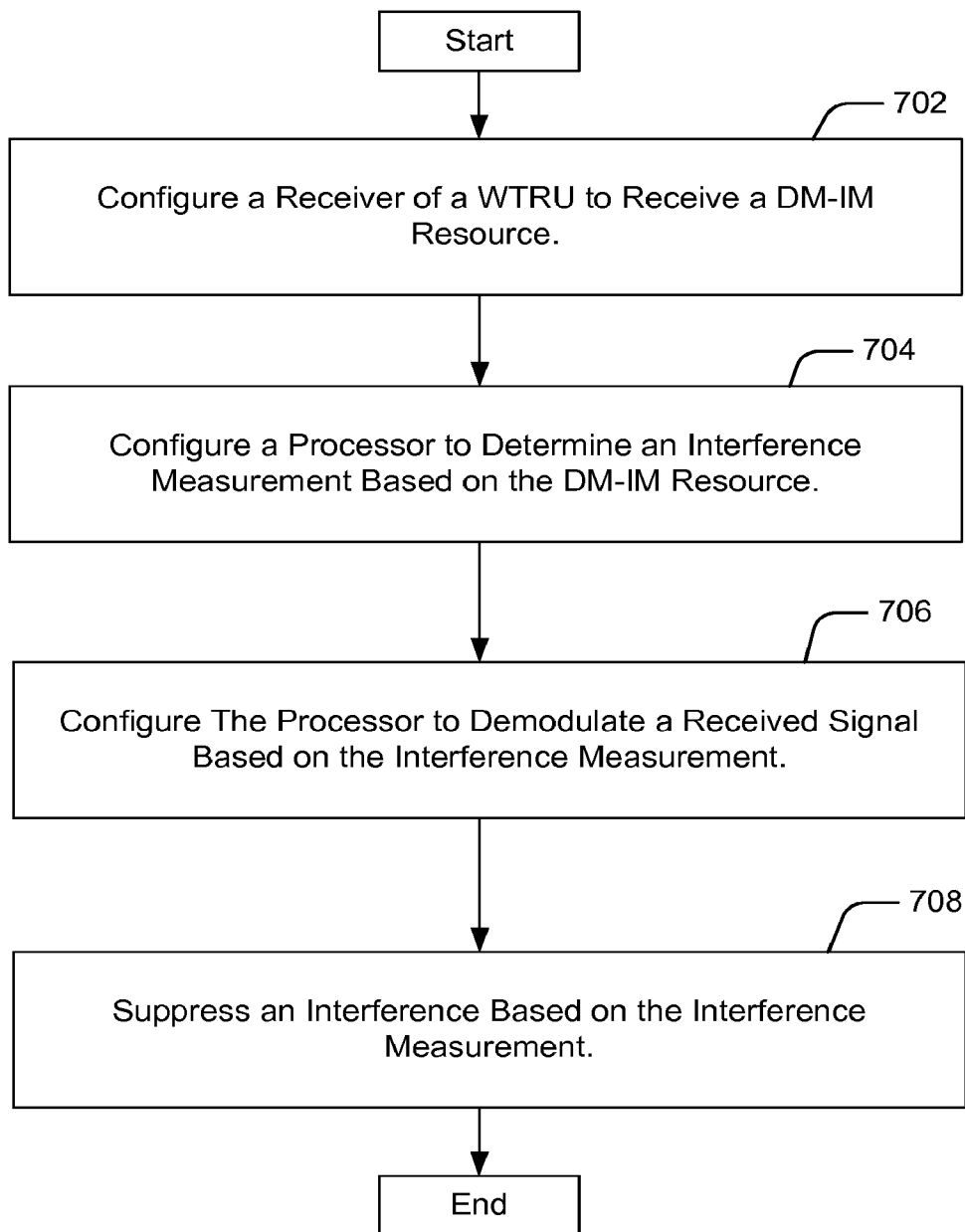
FIG. 7 is a flow diagram of an interference suppression process which may be performed in accordance with the present invention.

Referring now to FIG. 7, there is shown a flow diagram of an interference suppression process 700 for suppressing interference in a communication system. In interference suppression process 700 a receiver of a WTRU may be configured to receive a DM-IM resource, as shown in block 702. Furthermore, a processor may be configured to determine an interference measurement based on the DM-IM resource, as shown in block 704. The processor may also be configured to demodulate a received signal based on the interference measurement, as shown in block 706. An interference may be suppressed based on the interference measurement, as shown in block 708.

Figure 8:
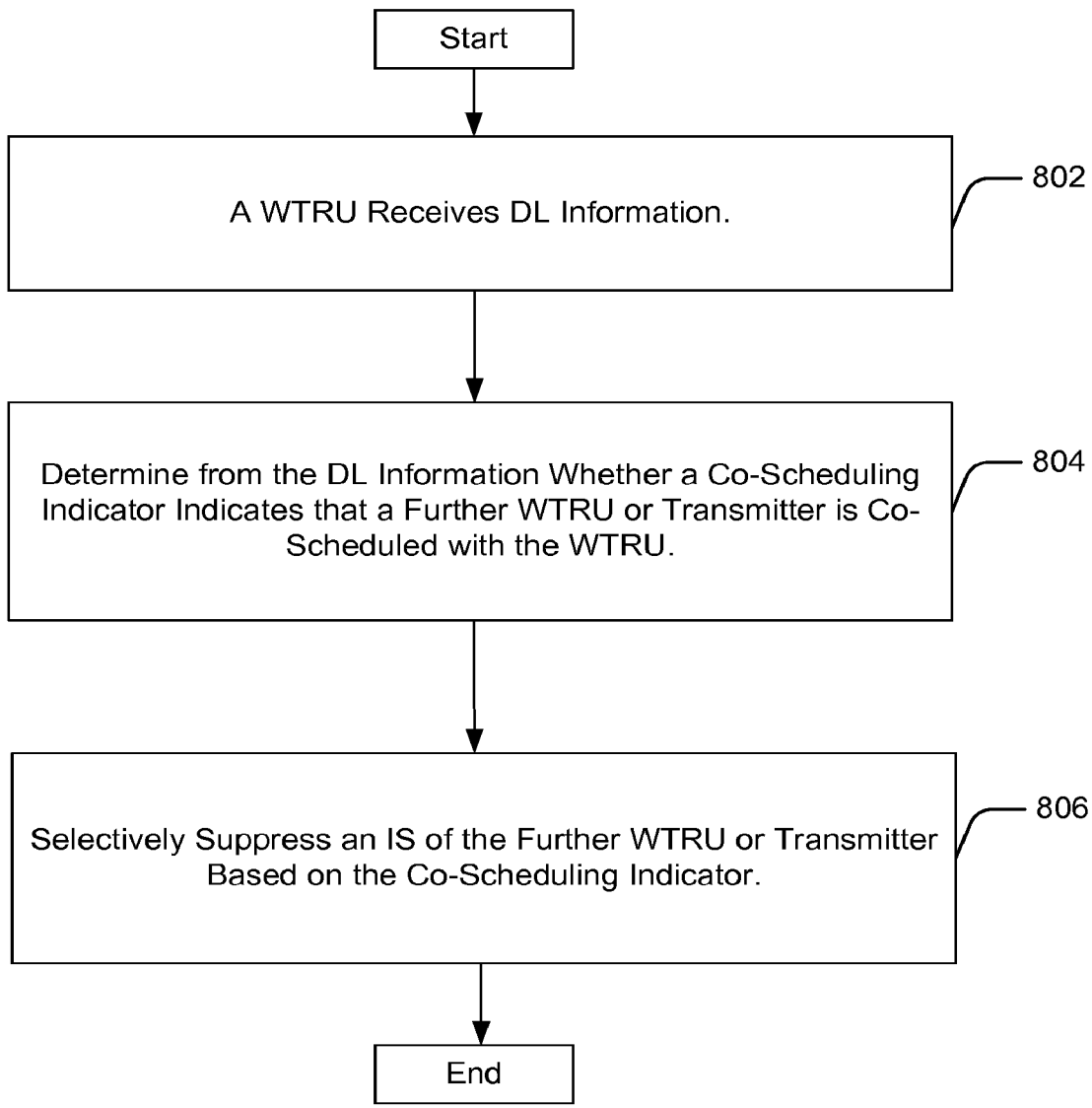
FIG. 8 is a flow diagram of an interference suppression process which may be performed in accordance with the present invention.

Referring now to FIG. 8, there is shown a flow diagram of an interference suppression process 800 for suppressing interference in a communication system. In interference suppression process 800, a WTRU may receive DL information as shown in block 802. As shown in block 804, a determination may be made from the DL information. The determination may be a determination whether a co-scheduling indicator indicates that a further WTRU or transmitter is co-scheduled with the WTRU. An IS of the further WTRU may be selectively suppressed based on the co-scheduling indicator, as shown in block 806.

Figure 9:
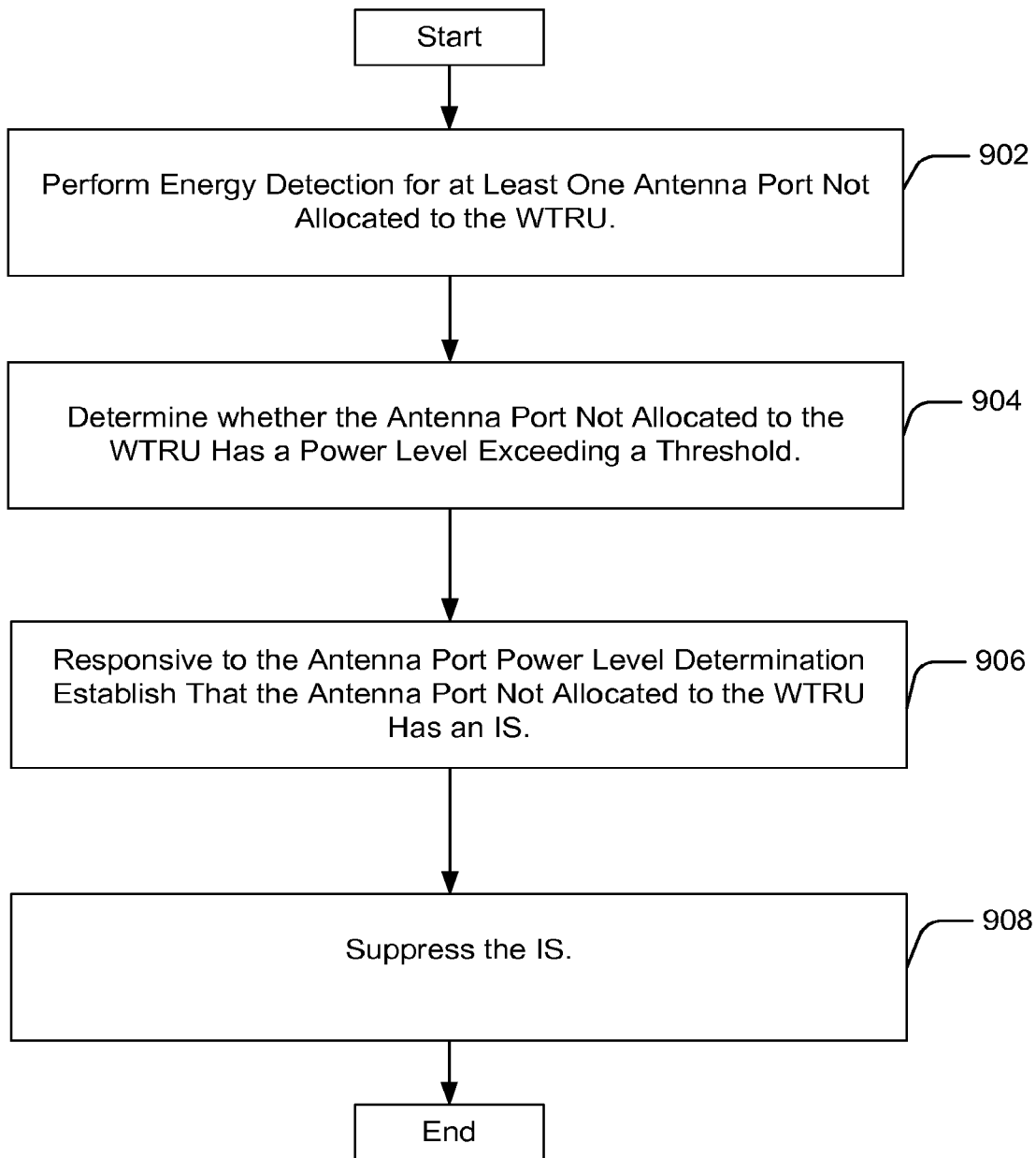
FIG. 9 is a flow diagram of an interference suppression process which may be performed in accordance with the present invention.

Referring now to FIG. 9, there is shown a flow diagram of an interference suppression process 900 for suppressing interference in a communication system. In interference suppression process 900, energy detection for at least one antenna port not allocated to the WTRU may be performed, as shown in block 902. As shown in block 904, a determination may be made whether the antenna port not allocated to the WTRU has a power level exceeding a threshold. Responsive to the antenna port power level determination it may be established that the antenna port not allocated to the WTRU has an IS, as shown in block 906. The IS may be suppressed as shown in block 908.

One of ordinary skill in the art will understand that many different embodiments of the foregoing method and devices are possible. For example, without any limitations, a method may be implemented by a WTRU including receiving a DM-IM resource, determining an interference measurement based on the DM-IM resource, and demodulating a received signal based on the interference measurement. The method may further include suppressing interference based on the interference measurement, wherein at least one DM-IM resource is located in a PRB. The DM-IM resource may be a plurality of DM-IM resources, the plurality of DM-IM resources may form a DM-IM pattern, and the DM-IM pattern may be located on at least one of a Physical Downlink Shared Channel (PDSCH) and/or an enhanced Physical Downlink Shared Channel (E-PDSCH) of at least one Long Term Evolution (LTE) subframe. The method may also include adjusting a DM-IM pattern in a LTE Resource Block (RB) based on at least one of a frame number associated with the LTE RB, a subframe number associated with the LTE RB, and/or an RB index associated with the LTE RB. The DM-IM resources are different for different Physical Resource Blocks (PRB) in the LTE subframe. The DM-IM resources are located in different respective symbols and the locations of the symbols may change relative to other symbols of the at least one LTE subframe. Receiving the DM-IM resource includes receiving a plurality of DM-IM resources, and/or dynamically adjusting a plurality of DM-IM resources in respective LTE subframes based on a higher layer signaling, and/or locating a DM-IM resource associated with the WTRU based on a cell specific identifier associated with a cell serving the WTRU.

A WTRU may receive a Downlink (DL) information and determine, from the DL information, whether a co-scheduling indicator indicates that a further WTRU or transmitter is co-scheduled with the WTRU. An Interfering Signal (IS) of the further WTRU or transmitter may be selectively suppressed based on the co-scheduling indicator.

Responsive to the co-scheduling indicator, indicating that the further WTRU or transmitter is co-scheduled, locating at least one Demodulation Reference Signals (DM-RS) associated with the co-scheduled WTRU or transmitter, and/or estimating an Interfering Signal (IS) using the located DM-RS associated with the co-scheduled WTRU or transmitter, may be performed.

The DL information includes a Downlink Control Information (DCI), and the method includes decoding the DL information, including the DCI. The determining includes establishing whether the further WTRU or transmitter is co-scheduled using the decoded DCI. The DL information can include a list of potentially interfering WTRUs or transmitters. The DL information includes DL assignment information regarding at least one potentially interfering WTRU or transmitter. The WTRU decodes the DL assignment information of the at least one potentially interfering WTRU or transmitter, and interference canceling and/or suppressing a signal associated with the at least one potentially interfering WTRU or transmitter is performed using the DL assignment information.

A method may be implemented by a WTRU including performing energy detection for at least one antenna port not allocated to the WTRU, and determining whether the at least one antenna port not allocated to the WTRU has a power level exceeding a threshold. Responsive to the determining, establishing that the at least one antenna port not allocated to the WTRU has an Interfering Signal (IS), and suppressing the IS are performed.

A method may be implemented by a WTRU including receiving Downlink Control Information (DCI), decoding a mode configuration information from the DCI, and selecting a WTRU operating mode of a plurality of WTRU operating modes based on the decoded mode configuration information. The plurality of WTRU operating modes includes a normal operating mode and an enhanced operating mode. The enhanced operating mode is a Network Assisted Interference Cancellation and Suppression (NAICS) mode. The selecting of the enhanced operating mode includes selecting based on a Cell Radio Network Temporary Identifier (C-RNTI). In the normal operating mode, a demodulation used for reception of a downlink transmission is based on complex-valued modulation. In the enhanced operating mode, the demodulation used for reception of a downlink transmission is based on only real valued modulation. Different WTRU operating modes are selected based on changing mode configuration information.

A method can be implemented by a WTRU including receiving a Downlink Control Information (DCI) of the WTRU and a DCI of an Interfering Signal (IS) associated with at least one further WTRU or transmitter, determining, in the DCI of the WTRU, an IS assignment indicator for indicating a location of the DCI of an IS assignment, and locating, based on an IS assignment indicator, the DCI of an IS associated with the at least one further WTRU or transmitter. The IS assignment indicator is located in at least one of a Network Assisted Interference Cancellation and Suppression (NAICS), a starting index of an Enhanced Control Channel Element (ECCE) of the DCI, or an aggregation level of the ECCE. The WTRU determines the IS assignment indicator information in the DCI. The WTRU makes a determination that the DCI is present in a predetermined search space in a current transmission to provide a DCI present determination, and/or a determination that the IS assignment indicator is present in the current transmission based on the DCI present determination.

A method may be implemented by a WTRU including receiving Downlink Control Information (DCI) of an Interfering Signal (IS) associated with at least one further WTRU or transmitter, decoding the DCI using a cell specific identifier common to the WTRU and/or the at least one further WTRU or transmitter, determining, from the decoded DCI, Interfering Signal (IS) information including a strongest interferer information regarding the strongest interferer of the at least one further WTRU or transmitter, determining a further cell specific indicator for the strongest interferer based on the strongest interferer information; and decoding downlink scheduling information of the strongest interferer using the further cell specific indicator. The DCI further includes Network Assisted Interference Cancellation and Suppression (NAICS) information. Decoding Physical Downlink Control Channel (PDCCH) information or Enhanced Physical Downlink Control Channel (E-PDCCH) information based on the NAICS information, and decoding a Downlink Shared Channel (PDSCH) based on the NAICS information, are performed.

A method can be performed by a WTRU including determining first and/or second latencies for transmission of a HARQ feedback associated with reception of a PDSCH based on whether an IS information for the PDSCH is received, transmitting the HARQ feedback in a first subframe based on the first latency when the IS information for the PDSCH is received, and transmitting the HARQ feedback in a second, different, subframe based on the second latency when the IS information for the PDSCH is not received. The first and/or second latency are determined based on whether the IS information is used. The first and/or second latency are determined based on a modulation scheme. The contents of the RP-130404, "Study on Network-Assisted Interference Cancellation and Suppression for LTE", 3GPP TSG RAN Meeting #59, February 2013, 3GPP TS 36.211, "Physical Channel and Modulation", V11.2.0, 2013-02, 3GPP TS 36.212, "Multiplexing and Channel Coding", V11.2.0, 2013-02, 3GPP TS 36.213, "Physical Layer Procedures", V11.2.0, 2013-02, and R1-131547 Network Assistance for Interference Cancelation for CRE; Ericsson, ST-Ericsson, are hereby incorporated by reference. Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit/receive unit (WTRU), comprising:
   receiving, in downlink control information (DCI), (1) information indicating a set of resource elements (REs) corresponding to reference signals, the reference signals used for demodulation of a physical downlink shared channel (PDSCH) transmission and (2) an indicator indicating additional REs correspond to additional reference signals, the additional reference signals also used for demodulation of the PDSCH transmission, the additional reference signals containing no PDSCH data;
   determining positions in time and frequency of the REs and the additional REs based on the received DCI;
   receiving the PDSCH transmission; and
   decoding the PDSCH transmission.

2. The method of claim 1, wherein the receiving of the PDSCH transmission includes rate matching the PDSCH around the determined positions in time and frequency of the REs and the additional REs to exclude the REs and the additional REs from the reception of the PDSCH.

3. The method of claim 1, wherein the received information in the DCI indicates at least some of the reference signals used for demodulation correspond to, contain, or are reserved for demodulation reference signal (DM-RS) transmission intended for the WTRU.

4. The method of claim 1, wherein at least some of the reference signals used for demodulation correspond to, contain, or are reserved for a co-scheduled demodulation reference signal (DM-RS) transmission.

5. The method of claim 1, wherein all of the reference signals used for demodulation correspond to, contain, or are reserved for demodulation reference signal (DM-RS) transmission intended for the WTRU or co-scheduled DM-RS transmission.

6. The method of claim 1, wherein the REs corresponding to the reference signals are orthogonal in frequency.

7. The method of claim 1, wherein the DCI includes any of: (1) one or more parameters indicating a pattern associated with the set of REs or (2) a value or an indication of the value indicating the pattern associated with the set of REs.

8. The method of claim 7, wherein the REs associated with the indicated pattern are adjacent REs in a resource block.

9. The method of claim 7, wherein the REs associated with the indicated pattern are a fixed number of REs within a resource block.

10. A wireless transmit/receive unit (WTRU), comprising:
    a transmit/receive unit configured to:
    receive, in downlink control information (DCI), (1) information indicating a set of resource elements (REs) corresponding to reference signals, the reference signals used for demodulation of a physical downlink shared channel (PDSCH) transmission and (2) an indicator indicating additional REs correspond to additional reference signals, the additional reference signals also used for demodulation of the PDSCH transmission, the additional reference signals containing no PDSCH data, and receive the PDSCH transmission; and a processor configured to:

determine positions in time and frequency of the REs and the additional REs based on the received DCI, and decode the PDSCH transmission.

11. The WTRU of claim 10, wherein the WTRU is configured to rate match the PDSCH around the determined positions in time and frequency of the REs and the additional REs to exclude the REs and the additional REs from the reception of the PDSCH.

12. The WTRU of claim 10, wherein at least some of the reference signals used for demodulation correspond to, contain, or are reserved for demodulation reference signal (DM-RS) transmission intended for the WTRU.

13. The WTRU of claim 10, wherein at least some of the reference signals used for demodulation correspond to, contain, or are reserved for a co-scheduled demodulation reference signal (DM-RS) transmission.

14. The WTRU of claim 10, wherein all of the reference signals used for demodulation correspond to, contain, or are reserved for demodulation reference signal (DM-RS) transmission intended for the WTRU or co-scheduled DM-RS transmission.

15. The WTRU of claim 10, wherein the REs corresponding to the reference signals are orthogonal in frequency.

16. The WTRU of claim 10, wherein the DCI includes any of: (1) one or more parameters indicating a pattern associated with the set of REs or (2) a value or an indication of the value indicating the pattern associated with the set of REs.

17. The WTRU of claim 16, wherein the REs associated with the indicated pattern are adjacent REs in a resource block.

18. The WTRU of claim 16, wherein the REs associated with the indicated pattern are a fixed number of REs within a resource block.

* * * * *